(12) United States Patent
Chen et al.

(10) Patent No.: US 12,362,874 B2
(45) Date of Patent: *Jul. 15, 2025

(54) ENHANCED RESOURCE ALLOCATION FOR WIRELESS COMMUNICATIONS

(71) Applicant: Intel Corporation, Santa Clara, CA (US)

(72) Inventors: Xiaogang Chen, Portland, OR (US); Daniel Bravo, Portland, OR (US); Laurent Cariou, Portland, OR (US); Po-Kai Huang, Portland, OR (US); Feng Jiang, Santa Clara, CA (US); Qinghua Li, San Ramon, CA (US); Robert Stacey, Portland, OR (US)

(73) Assignee: Intel Corporation, Santa Clara, CA (US)

(*) Notice: Subject to any disclaimer, the term of this patent is extended or adjusted under 35 U.S.C. 154(b) by 814 days.

This patent is subject to a terminal disclaimer.

(21) Appl. No.: 17/470,708

(22) Filed: Sep. 9, 2021

(65) Prior Publication Data

US 2021/0409172 A1 Dec. 30, 2021

Related U.S. Application Data

(63) Continuation-in-part of application No. 16/403,508, filed on May 4, 2019, now Pat. No. 11,539,482.

(60) Provisional application No. 62/666,862, filed on May 4, 2018.

(51) Int. Cl.
*H04W 72/04* (2023.01)
*H04L 5/00* (2006.01)
*H04W 72/0453* (2023.01)

(52) U.S. Cl.
CPC .......... *H04L 5/0041* (2013.01); *H04L 5/0048* (2013.01); *H04W 72/0453* (2013.01)

(58) Field of Classification Search
None
See application file for complete search history.

(56) References Cited

U.S. PATENT DOCUMENTS 10,687,281 B2 * 6/2020 Son ................. H04L 5/0041
11,539,482 B2 * 12/2022 Chen ................ H04L 5/0053

* cited by examiner

*Primary Examiner* — Willie J Daniel, Jr.
(74) *Attorney, Agent, or Firm* — Eversheds Sutherland (US) LLP

(57) ABSTRACT

This disclosure describes systems, methods, and devices related to allocating non-continuous resource units (RUs). A device may determine a non-continuous RU allocation for one or more devices in a 80 MHz bandwidth including four 20 MHz channels, the non-continuous RU allocation including disabled tones of a 20 MHz channel of the four 20 MHz channels, and the disabled tones being a subset of tones within the 20 MHz channel. The device may determine a high efficiency wireless frame comprising an indication of the non-continuous RU allocation. The device may send the high efficiency wireless frame to one or more multiple devices.

17 Claims, 11 Drawing Sheets ions may

ENHANCED RESOURCE ALLOCATION FOR WIRELESS COMMUNICATIONS

CROSS-REFERENCE TO RELATED APPLICATIONS

This application is a continuation of U.S. Non-Provisional application Ser. No. 16/403,508, filed May 4, 2019, which claims the benefit of U.S. Provisional Application No. 62/666,862, filed May 4, 2018, the disclosures of which are incorporated by reference as if set forth in full.

TECHNICAL FIELD

This disclosure generally relates to systems and methods for wireless communications and, more particularly, to non-continuous resource unit allocation in high efficiency wireless (HEW) communications.

BACKGROUND

Wireless devices are becoming widely prevalent and are increasingly requesting access to wireless channels. The Institute of Electrical and Electronics Engineers (IEEE) is developing one or more standards that define channel allocations.

DETAILED DESCRIPTION

Figure 1:
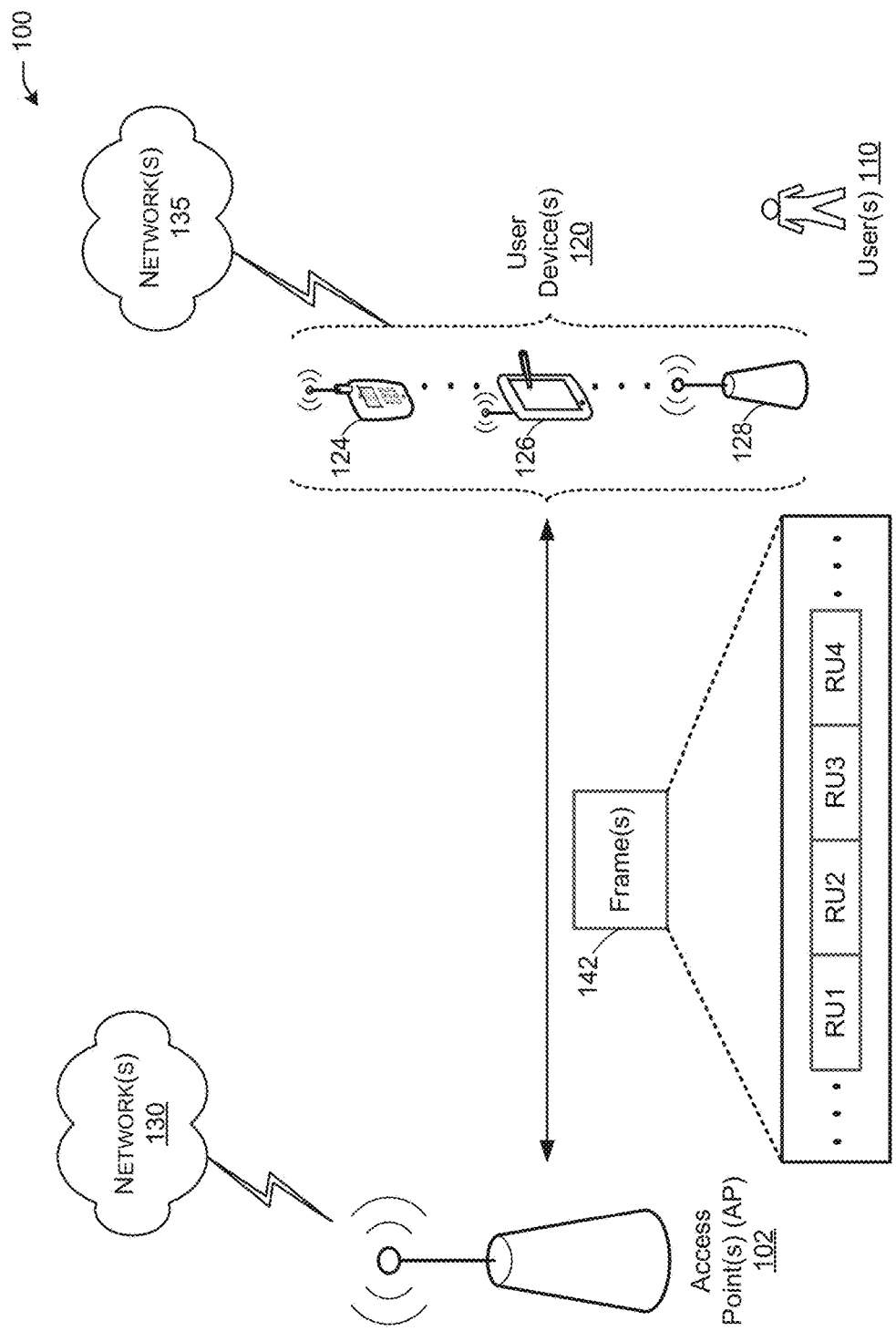
FIG. 1 is a network diagram illustrating an example network environment, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Wireless local area networks (WLAN) may be implemented using Wi-Fi protocols defined by the IEEE 802.11 family of technical standards. WLANs may include multiple devices such as access points (AP) and stations (STA), which may send a variety of frames to one another. For example, an AP may allocate one or more resource units (RUs) to associated STAs (e.g., in a basic service set) for downlink (e.g., transmissions from the AP to one or more STAs) and/or uplink (e.g., transmissions from one or more STAs to an AP) transmissions. A RU may refer to a group of subcarriers (e.g., frequency domain tones) in a frequency band. The size of a RU and the tone location in a frequency band may depend on the size of the frequency band and the number of STAs to which one or more RUs are allocated in the frequency band.

In some of the IEEE 802.11 technical standards, RU allocation may be limited to a single RU per STA (e.g., one STA may not be allocated multiple RUs within a bandwidth). Such RU limitation may not be desirable, however, in 5 GHz frequencies or other frequency bands. In particular, Wi-Fi communications may use dynamic frequency selection (DFS) to facilitate communications in 5 GHz frequencies, and non-contiguous RU allocation (e.g., non-contiguous RUs within a bandwidth) for a single STA may be beneficial in the 5 GHz frequencies due to interference from other devices and/or modes of communication that exist in 5 GHz frequencies. For example, an AP may indicate to one or more STAs a 20 MHz disabled channel or sub-channel in HEW operating elements (e.g., a disabled 20 MHz channel in a 80 MHz bandwidth, which renders a RU allocation non-contiguous within the 80 MHz bandwidth). However, to avoid significant changes to the defined protocols in the IEEE 802.11 technical standards, some changes to the physical layer (PHY) and medium access control (MAC) layer of wireless devices may be needed to implement enhanced non-continuous RU allocation.

In current versions of the IEEE 802.11 technical standards, the 80 MHz frequency resource is a contiguous frequency resource. That is, when the 80 MHz bandwidth is divided into four RUs (e.g., RU1, RU2, RU3, RU4), a STA may be assigned RU1-RU4, RU1 and RU2, or RU3 and RU4 (e.g., contiguous or continuous RUs), but not RU1-RU3, RU2-RU4, RU1 and RU3, or RU2 and RU4 (e.g., non-contiguous or non-continuous RUs). In particular, there is not currently a defined non-contiguous RU allocation in the IEEE 802.11ax technical standard (e.g., an allocation of RU1 and RU3 or RU2 and RU4). To avoid interference from an adjacent transmission, for example, a non-contiguous RU allocation may be implemented, but such an implementation may require a definition of a new RU due to a problem of puncturing (e.g., disabling) tones as explained further below. For example, puncturing is not currently applicable to a RU, but instead is applied to a 20 MHz channel or sub-channel, thereby resulting in a portion of a RU being punctured. While the IEEE 802.11 technical standards define a RU with 242 tones, there is not currently a defined RU when, for example, some of the 242 tones are punctured (e.g., the RU has 240 tones instead of 242 tones, as explained further below). Therefore, wireless devices may benefit from a definition of the exact boundary of disabled tones without requiring the disabling of an entire sub-channel (e.g., a 20 MHz sub-channel).

By defining enhanced non-continuous RU allocation, wireless devices may require minimal changes, thereby allowing efficient implementation.

Example embodiments of the present disclosure relate to systems, methods, and devices for non-continuous resource unit allocation in HEW communications.

In one or more embodiments, a RU allocation may allow for puncturing some tones within a bandwidth without having to puncture an entire sub-channel of the bandwidth. For example, in a 80 MHz bandwidth with four 20 MHz portions and four RUs, rather than puncturing an entire 20 MHz portion, specific tones may be punctured in a manner which does not exactly align with the boundaries of a 20 MHz portion of the 80 MHz bandwidth. For example, the IEEE 802.11 technical standards define RUs of different sizes and provide tone maps (e.g., physical tone indices corresponding to frequency domain locations for different types of subcarriers) for RUs of different sizes in different frequency band sizes. In particular, because a first RU of four RUs in a 80 MHz bandwidth may have 242 tones (e.g., from tone −500 through tone −259 of a tone index), and a second RU of the four RUs may have 242 tones (e.g., from tone −258 through tone −17 of a tone index), and because the first 20 MHz of the 80 MHz bandwidth may span from tone −500 through tone −257, allowing the puncturing of the first 20 MHz bandwidth may result in puncturing (e.g., disabling) two tones of the second RU (e.g., tone −258, tone −257). The result may be that the second RU only has 240 tones instead of 242 tones, but there is no defined RU for 240 tones in the IEEE 802.11 technical standards. Therefore, to allow puncturing, new RUs may be defined and signaled (e.g., communicated to STAs).

In one or more embodiments, wireless devices may benefit from having to define a new RU tone allocation for a punctured RU caused by the misalignment issue defined above. Defining a new RU may require defining new HEW signaling (e.g., the current HEW signaling defined by the IEEE 802.11ax technical standard does not define the signaling for such a new RU) and may require changes to channel coding, interleaver design for binary convolutional codes (BCC), packet extension definition, modulation and coding scheme (MCS) definitions, padding, tone allocations, another other changes to defined protocols for Wi-Fi communications.

In one or more embodiments, instead of disabling an exact 20 MHz portion of a 80 MHz channel, non-continuous resource unit allocation in HEW communications may disable a bandwidth close to, but not exactly, the 20 MHz portion. For example, in a 80 MHz channel, non-continuous resource unit allocation in HEW communications may define multiple disable patterns, such as a pattern P1 for tone indices −512:−259 (tone −512 through tone −259), a pattern P2 for tone indices −258:−4, 4:16 (tone −258 through tone −4, and tone 4 through tone 16), a pattern P3 for tone indices −16:−4, 4:258 (tone −16 through tone −4, and tone 4 through tone 258), and a pattern P4 for tone indices 259:511 (tone 259 through tone 511). Using such tone patterns, the disabling of any RUs for non-continuous resource unit allocation in HEW communications may not result in a punctured RU requiring additional definition and changes to Wi-Fi protocols.

In one or more embodiments, non-continuous resource unit allocation in HEW communications may disable an exact 20 MHz portion of a 80 MHz channel (resulting in a punctured RU). However, to avoid introducing significant changes to Wi-Fi devices and to Wi-Fi protocols, the RU allocation may be made transparent to baseband processing of wireless devices. In particular, a wireless device transmitter may follow exact baseband processing process flows as defined by the IEEE 802.11ax technical standard. As a result, some tones may fall within a disabled 20 MHz channel. The baseband processing may include coding and tone mapping as if no puncturing is conducted, however. Because the transmitter needs to meet the requirement of the disabled band, the requirement of preamble puncturing as defined by the IEEE 802.11ax technical standard may be reused to minimize the changes required to implement non-continuous resource unit allocation in HEW communications. The signal leakage to the disabled 20 MHz channel from occupied sub-channels (e.g., other 20 MHz sub-channels in the 80 MHz channel) may be less than or equal to −20 dBr (db relative to the maximum spectral density of the signal), starting at 0.5 HMz from the boundary of the disabled channel. Such may result in the punctured tones either having reduced power or zero power so that the receiving device may consider the constellations in the punctured tones as punctured or unreliable constellations for the purpose of decoding the wireless signal. While the punctured tones may impact the signal detection performance of a wireless device, the IEEE 802.11ax technical standard baseband processing may be reused for ease of implementation.

In one or more embodiments, non-continuous resource unit allocation in HEW communications may define a RU size for a single user (SU) PPDU. For example, either one 20 MHz channel may be disabled in a 80 MHz channel, or multiple 20 MHz channels (e.g., sub-channels) may be disabled in a 80 MHz channel. When multiple (e.g., two) 20 MH non-adjacent sub-channels are disabled (e.g., using either a disable pattern of P1+P3 or P2+P4 as defined above), the remaining two 20 MHz RUs may add up to a 484-tone RU as defined by the IEEE 802.11ax technical standard. When one 20 MHz sub-channel is disabled and the inexact disabled bandwidth defined above is used, non-continuous resource unit allocation in HEW communications may use a new RU corresponding to 60 MHz (e.g., the non-disabled 60 MHz of the 80 MHz channel). The RU size may depend on which disable pattern is applied. For example, when pattern P1 or pattern P4 is applied, the resulting RU may be a 242*3+26 tone RU. When pattern P2 or pattern P3 is applied, the resulting RU may be 242*3 tones. Neither of these RUs are currently defined in the IEEE 802.11ax technical standard, so the present disclosure provides for signaling and processing of the new RUs for non-continuous RU allocation.

In one or more embodiments, non-continuous resource unit allocation in HEW communications may define a RU size for multi-user (MU) PPDUs (e.g., PPDUs sent to multiple STAs) and trigger-based (TB) PPDUs (e.g., PPDUs sent by STAs in response to trigger frames sent by an AP). For an orthogonal frequency division multiple access (OFDMA) transmission using MU PPDU or TB PPDU, if a non-continuous RU allocation is allowed, many new RU sizes may result (e.g., 242+26 tone RU, 242+52 tone RU, 52+52 tone RU, etc.), significantly impacting the IEEE 802.11ax technical standard implementation and protocols. To allow for both SU PPDU and MU PPDU communications, non-continuous resource unit allocation in HEW communications may add a single new RU size to allow for more transmission efficiency. For example, the new RU size may be 242*3+26 or 242*3 based on which disabled pattern is applied, or non-continuous resource unit allocation in HEW communications may avoid adding any new RU size, thereby not allowing the 60 MHz PPDU for SU transmissions.

In one or more embodiments, SU non-continuous resource unit allocation in HEW communications may not require new RU signaling because the information for a disabled RU may be communicated and acknowledged during the association stage (e.g., the stage when STAs request and establish association with a basic service set of an AP). Wireless device transmitters and receivers may follow the baseband processing protocols described above and may skip the disabled RU when applying tone mapping or de-mapping.

In one or more embodiments, MU non-continuous resource unit allocation in HEW communications may update RU allocation signaling. For example, the high efficiency signal-B (HE-SIG-B) field of a HEW MU PPDU may need to be updated. To enable the non-continuous RU allocation in HEW communications, an STA may expect to identify more than one user information field in downlink HEW MU PPDU sent by an AP and having an STA identifier matching the receiving STA's identifier (e.g., a receiving STA may identify multiple user information fields addressed to the STA). The STA may parse any RU allocation signaling addressed to the STA in a HEW MU PPDU.

In one or more embodiments, non-continuous resource unit allocation in HEW communications may provide MAC process changes. For example, non-continuous resource unit allocation in HEW communications may define long-term puncturing signaling for the MAC. The signaling may be included in a high efficiency (HE) operation element of a probe response sent by an AP (e.g., in response to a probe request in which a STA seeks an indication of which wireless networks are provided by any nearby APs), an association or re-association response (e.g., sent by an AP in response to an association or re-association request sent by a STA to associate with a wireless network provided by the AP), beacon sent by the AP, or another frame sent by an AP. The signaling may define the RUs, the subcarriers, and/or the bandwidth (e.g., 5 MHz wide, 20 MHz wide, etc.) that may be used and unused for non-continuous resource unit allocation. A STA associated with an AP may respect the constraints imposed on RU allocation based on the signaling, regardless of the STA transmission mode.

In one or more embodiments, if the long-term signaling defined above for non-continuous resource unit allocation is used in HE SU PPDUs for a wide and punctured transmission, the IEEE 802.11 technical standards may need to define a tone mapping between the bandwidth of the PPDU, the section within the bandwidth that is punctured, and a specific mode of transmission with tone assignment and interleaver design. For example, with long-term signaling indicating a puncturing of a secondary 20 MHz channel, and if the PPDU indicates in a high efficiency signal-A (HE-SIG-A) field transmission of a 80 MHz PPDU transmission, non-continuous resource unit allocation may use a 484-tone RU+a 242-tone RU mode in which coding is performed across the entirety of the 242+484 tones, but interleaving may be performed separately on the 484-tone RU and the 242-tone RU. Both a receiver and transmitter may identify the parameters in the HE-SIG-A field and in the long-term signaling that there is a single transmission mode available for use.

In one or more embodiments, non-continuous resource unit allocation in HEW communications may signal non-continuous RU allocations using HE MU PPDUs using multiple options. One option (option 1) may be the same as for the SU PPDU, in which long-term signaling indicates the disabled 20 MHz channels, and based on the bandwidth of the PPDU signaled in the HE-SIG-A field and on the RU assigned to the STA in the HE-SIG-B field or another field of the PPDU, the IEEE 802.11ax technical standard may define a specific tone mapping for the resulting RU (e.g., possibly non-continuous) assigned to the STA. Another option (option 2) may assign multiple RUs to a single STA as indicated in the HE-SIG-B field or another field of a PPDU. The resulting non-continuous RU may be the sum of the two or more RUs assigned to the STA. The IEEE 802.11ax technical standard may define the resulting non-continuous RUs based on the combination of allocated RUs, allowing for more combinations of RUs corresponding to different modes of communication. Another option (option 3) may require adding more entries to an RU allocation table in a PPDU to explicitly indicate non-continuous RU modes, thereby allowing the HE-SIG-B field of a PPDU to use a single per-user field for RU allocations.

In one or more embodiments, non-continuous resource unit allocation in HEW communications may use the options defined above for HE MU PPDUs when using uplink TB PPDUs, but with some adjustments. In one option (option 1), the tone mapping may account for the bandwidth, which may be indicated in the common information filed of a trigger frame, in the RU allocation indicated in the user information field, and/or in the long-term signaling. In another option (option 2), multiple user information fields per STA may be allowed. The total assigned RU may be the result of the combination of the different RUs assigned in the user information fields addressing a single STA. A rule may allow multiple user information fields per STA to be transmitted next to each other (e.g., consecutively in the trigger frame) in a list of the user information fields for the multiple addressed STAs. Another option (option 3) may use a single information field in the trigger frame, but the table for the RU allocation may be modified to include non-continuous RUs.

In one or more embodiments, STAs and APs may include a capability bit in any frames. The capability bit may indicate that the devices support SU punctured mode.

In one or more embodiments, to puncture RUs with a granularity less than 20 MHz, Wi-Fi clear channel assessment (CCA) may use additional rules (e.g., not currently defined by the IEEE 802.11 technical standards) for coexistence with legacy devices (e.g., pre-IEEE 802.11ax HEW devices).

In the present disclosure, HEW may refer to transmissions defined by the IEEE 802.11ax technical standard, or to next generation transmissions such as extremely high throughput (EHT) Wi-Fi transmissions.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an exemplary network environment, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 5:
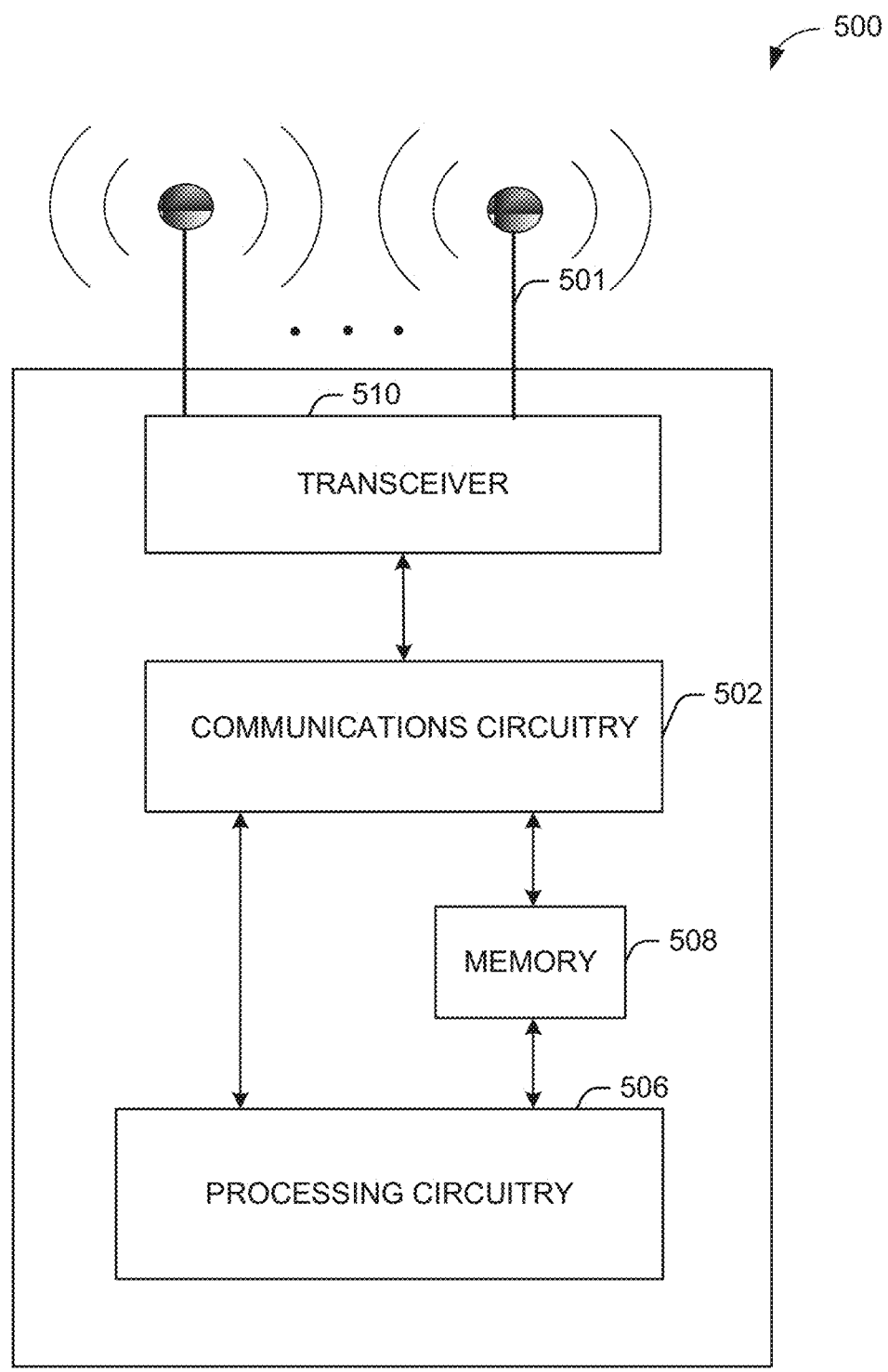
FIG. 5 illustrates a functional diagram of an exemplary communication station that may be suitable for use as a user device, in accordance with one or more example embodiments of the present disclosure.
Figure 6:
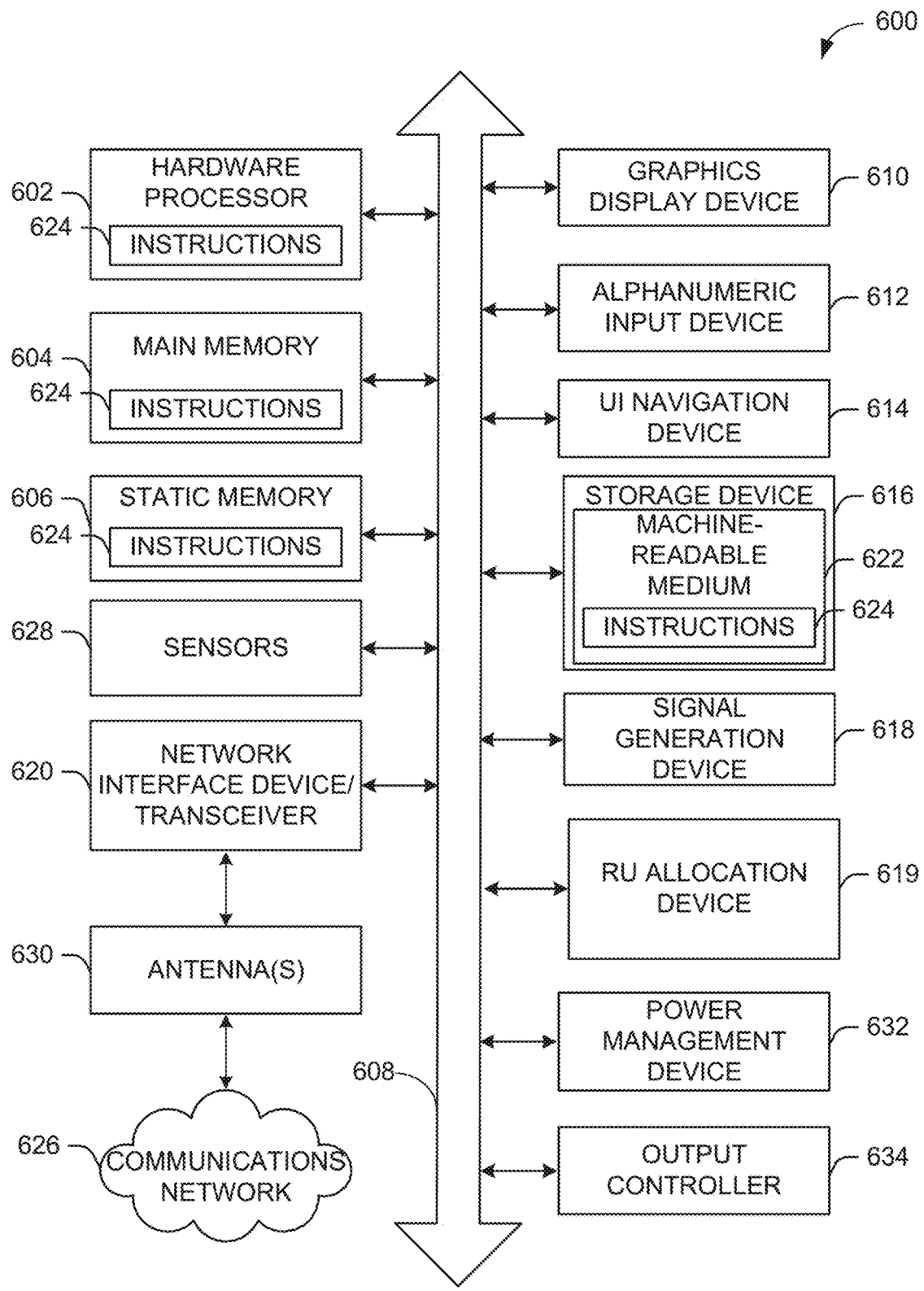
FIG. 6 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 5 and/or the example machine/system of FIG. 6.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile (e.g., a static) device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile Internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad, 802.1 lay). 800 MHz channels (e.g., 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may communicate with one or more user devices 120. The AP 102 and the one or more user devices 120 may exchange one or more frames 142. The one or more frames may include beacon frames, trigger frames, other downlink frames, uplink frames, or other types of frames, for example HEW frames for SU or MU modes. The one or more frames 142 may include signaling or other indications of RU allocation to the one or more user devices 120. For example, the one or more frames 142 may indicate RUs or disabled RU patterns to apply. The one or more frames 142 may include RU allocations and disabled RU indications in user information fields of a trigger frame, or in a probe response frame, association response frame, or reassocation response frame. The one or more frames 142 may include HEW PPDUs, which may indicate RUs and disabled RUs using an HE-SIG-B field. As shown, the AP 102 may allocate up to four RUs (e.g., RU1, RU2, RU3, RU4) of 20 MHz in a 80 MHz channel. One or more of the RUs may be disabled. Table 1 below shows an example of a 242-tone RU allocation in a 80 MHz PPDU.

TABLE 1

Tone Allocation for 242-tone RU in a 80 MHz PPDU:

| 242-tone RU | RU1: [−500:−259] | RU2: [−258:−17] | RU3: [17:258] | RU4: [259:500] |
|---|---|---|---|---|

Referring to Table 1 above, RU1, RU2, RU3, and RU4 each may include 242 tones (e.g., as defined by the IEEE 802.11 technical standards). The bracketed number ranges refer to the tone indices of the RUs. In particular, RU1 includes tones from −500 through −259 on a physical tone index; RU2 includes tones from −258 through −17 on the physical tone index; RU3 includes tones from 17 through 258 on the physical tone index; and RU4 includes tones from 259 through 500 on the physical tone index (e.g., a total of 1024 tones for the 80 MHz bandwidth). The four 20 MHz channels within a 80 MHz bandwidth do not align exactly with the tone indices of the RUs. Such may be the case for other size channels within a bandwidth as well. For example, in a 80 MHz bandwidth, the first 20 MHz may include twelve guard tones (e.g., at the edge of the bandwidth), plus a 242-tone RU, plus additional tones (e.g., two tones) of the next 242-tone RU. Therefore, disabling the first 20 MHz of an 80 MHz bandwidth may disable all of the tones of the first RU, plus tones of the second RU as explained further below.

In one or more embodiments, when a 20 MHz channel in the lowest frequency portion of a 80 MHz channel is disabled (e.g., tone indices from −512:−257 are disabled in the 80 MHz channel), the first RU (e.g., RU1) corresponding to the first 20 MHz of the 80 MHz channel (e.g., the first RU of four 20 MHz RUs in the 80 MHz channel) may be disabled along with two additional tones on a second RU (e.g., RU2) of the 80 MHz channel (e.g., tones −258 and −257 may be disabled and may be tones of the second RU). Such misalignment may create a new punctured RU, meaning that the RU size of the second RU with punctured tones (e.g., tones −258 and −257) may not correspond to any RU defined by the IEEE 802.11ax technical standard, and therefore no tone mapping may be available for the punctured RU. In particular, the resulting RU may include 240 tones (e.g., 242 tones minus the two punctured tones), and no such RU size is provided for by the IEEE 802.11 technical standards. Mapping, coding, and interleaving for a RU not defined in the IEEE 802.11 technical standards, for example, may require significant changes to the PHY and/or MAC layers, and the new RU may require signaling that both an AP and STAs may recognize in order to communicate the RU and its associated tones.

In one or more embodiments, the one or more frames 142 may define multiple disable patterns, such as a pattern P1 for tone indices −512:−259 (tone −512 through tone −259), a pattern P2 for tone indices −258:−4, 4:16 (tone −258 through tone −4, and tone 4 through tone 16), a pattern P3 for tone indices −16:−4, 4:258 (tone −16 through tone −4, and tone 4 through tone 258), and a pattern P4 for tone indices 259:511 (tone 259 through tone 511). Using such tone patterns instead of the currently defined 242-tone RU for a 20 MHz portion of a 80 MHz channel, the disabling of any RUs for non-continuous resource unit allocation in HEW communications may not result in a punctured RU requiring additional definition and changes to Wi-Fi protocols.

In one or more embodiments, non-continuous resource unit allocation in HEW communications may disable an exact 20 MHz portion of a 80 MHz channel (resulting in a punctured RU). For example, any of RU1, RU2, RU3, or RU4 may be disabled. However, to avoid introducing significant changes to Wi-Fi devices and to Wi-Fi protocols, the RU allocation may be made transparent to baseband processing of wireless devices. Some tones may fall within a disabled 20 MHz channel RU. The baseband processing may include coding and tone mapping as if no puncturing is conducted, however.

In one or more embodiments, the one or more frames 142 may define one or more RU sizes for a SU PPDUs. For example, either one 20 MHz channel (e.g., RU1, RU2, RU3, or RU4) may be disabled in a 80 MHz channel, or multiple 20 MHz channels may be disabled in a 80 MHz channel. When multiple (e.g., two) 20 MH sub-channels are disabled (e.g., using either a disable pattern of P1+P3 or P2+P4 as defined above), the remaining two 20 MHz RUs may add up to a 484-tone RU as defined by the IEEE 802.11ax technical standard. When one 20 MHz sub-channel is disabled and the inexact disabled bandwidth defined above is used, non-continuous resource unit allocation in HEW communications may use a new RU corresponding to 60 MHz (e.g., the non-disabled 60 MHz of the 80 MHz channel). The RU size may depend on which disable pattern is applied. For example, when pattern P1 or pattern P4 is applied, the resulting RU may be a 242*3+26 tone RU. When pattern P2 or pattern P3 is applied, the resulting RU may be 242*3 tones. Neither of these RUs are currently defined in the IEEE 802.11ax technical standard.

In one or more embodiments, the one or more frames 142 may be HEW MU PPDUs having the RU allocation in a HE-SIG-B field.

In one or more embodiments, if the one or more frames 142 indicate in a HE-SIG-A field transmission of a 80 MHz PPDU transmission, non-continuous RU allocation may use a 484-tone RU+a 242-tone RU mode in which coding is performed across the entirety of the 242+484 tones, but interleaving may be performed separately on the 484-tone RU and the 242-tone RU. Both a receiver and transmitter may identify the parameters in the HE-SIG-A field and in the long-term signaling that there is a single transmission mode available for use.

In one or more embodiments, non-continuous resource unit allocation in HEW communications may signal non-continuous RU allocations using the one or more frames 142 using multiple options. One option (option 1) may be the same as for the SU PPDU, in which long-term signaling indicates the disabled 20 MHz channels, and based on the bandwidth of the one or more frames 142 signaled in the HE-SIG-A field and on the RU assigned to the one or more user devices 120 in the HE-SIG-B field or another field of the one or more frames 142, the IEEE 802.11ax technical standard may define a specific tone mapping for the resulting RU (e.g., possibly non-continuous) assigned to the one or more user devices 120. Another option (option 2) may assign multiple RUs to a single STA of the one or more user devices 120 as indicated in the HE-SIG-B field or another field of the one or more frames 142. The resulting non-continuous RU may be the sum of the two or more RUs assigned to the STA.

In one or more embodiments, non-continuous resource unit allocation in HEW communications may use the options defined above for the one or more frames 142 (e.g., HE MU PPDUs) when using uplink TB PPDUs, but with some adjustments. In one option (option 1), the tone mapping may account for the bandwidth, which may be indicated in the common information filed of a trigger frame, in the RU allocation indicated in the user information field, and/or in the long-term signaling. In another option (option 2), multiple user information fields per user device of the one or more user devices 120 may be allowed. The total assigned RU may be the result of the combination of the different RUs assigned in the user information fields addressing a single STA of the one or more user devices 120. A rule may allow multiple user information fields per STA of the one or more user devices 120 to be transmitted next to each other (e.g., consecutively in the trigger frame) in a list of the user information fields for the multiple addressed STAs of the one or more user devices 120. Another option (option 3) may use a single information field in the trigger frame, but the table for the RU allocation may be modified to include non-continuous RUs.

In one or more embodiments, the one or more user devices 120 and AP 102 may include a capability bit in the one or more frames 142. The capability bit may indicate that the devices support SU punctured mode.

It is understood that the above descriptions are for purposes of illustration and are not meant to be limiting.

Figure 2:
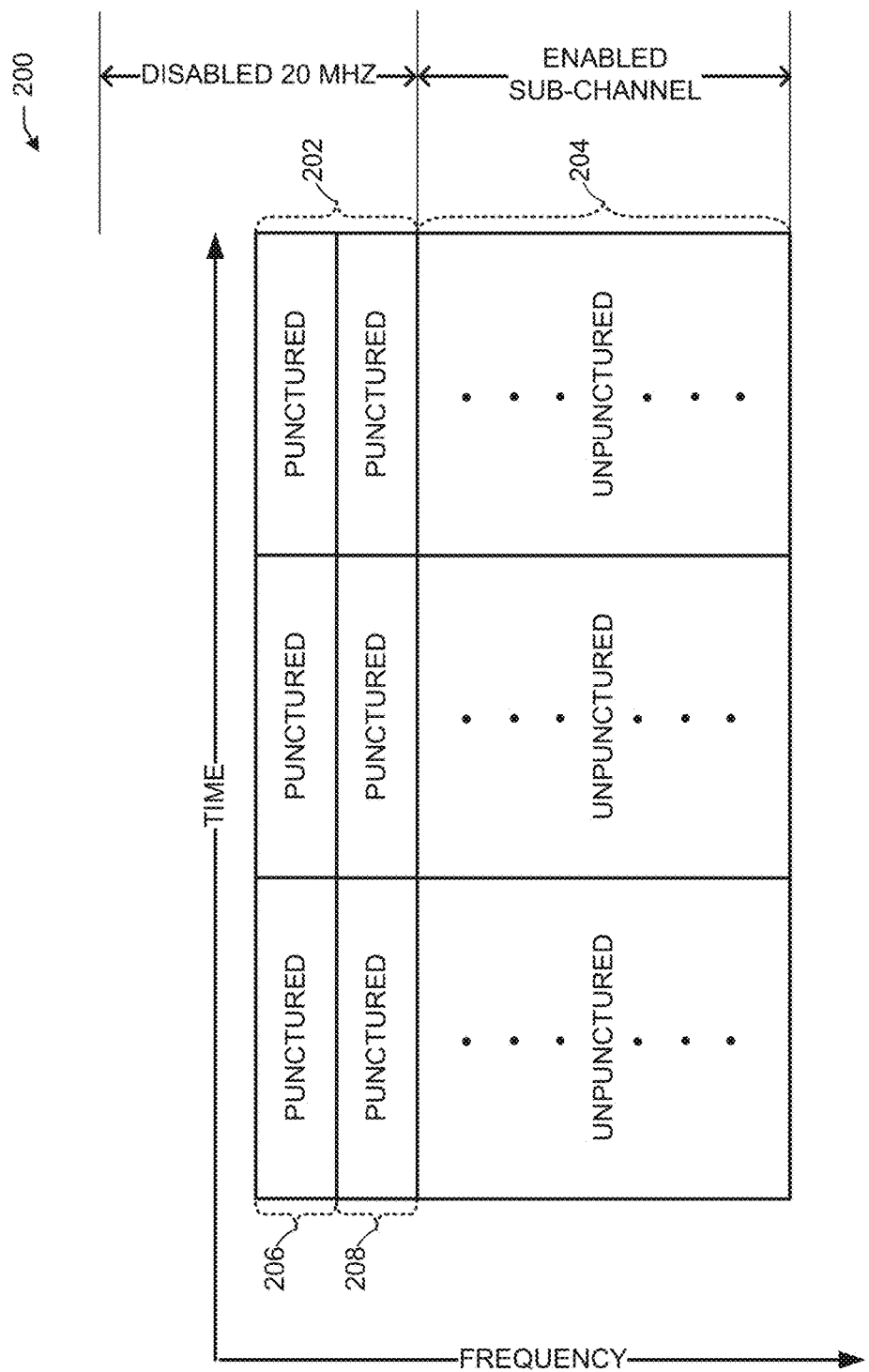
FIG. 2 depicts an illustrative chart of tone puncturing, in accordance with one or more example embodiments of the present disclosure.

FIG. 2 depicts an illustrative chart 200 of tone puncturing, in accordance with one or more example embodiments of the present disclosure.

Referring to FIG. 2, the chart 200 shows punctured tones 202 and unpunctured tones 204 across the frequency and time domains. For example, tone 206 and tone 208 may be punctured tones, and tones 204 may be unpunctured tones. The punctured tones 202 may be tones of a disabled 20 MHz sub-channel RU allocation (e.g., including a first RU and the punctured tones 202 of a second RU), and the unpunctured tones 204 may be tones of an enabled sub-channel (e.g., enabled tones of the second RU and other RUs). For example, in a 80 MHz channel, at least one 20 MHz portion or another size portion may be disabled (e.g., unused for an RU), and at least one other portion may be enabled, with the enabled portion being non-continuous.

In one or more embodiments, if the RU allocation disables an exact 20 MHz portion of a larger bandwidth, then some tones may be punctured (e.g., punctured tones 202). When the IEEE 802.11ax baseband processing, including coding and tone mapping, are applied as if no puncturing is conducted, then the signal leakage to the disabled 20 MHz channel from the enabled sub-channel may be small (e.g., less than −20 dBr). The punctured tones 202 may have little or no power, so a receiving device may consider constellations of the punctured tones 202 as punctured or unreliable when decoding any signal using the punctured tones 202.

Figure 3:
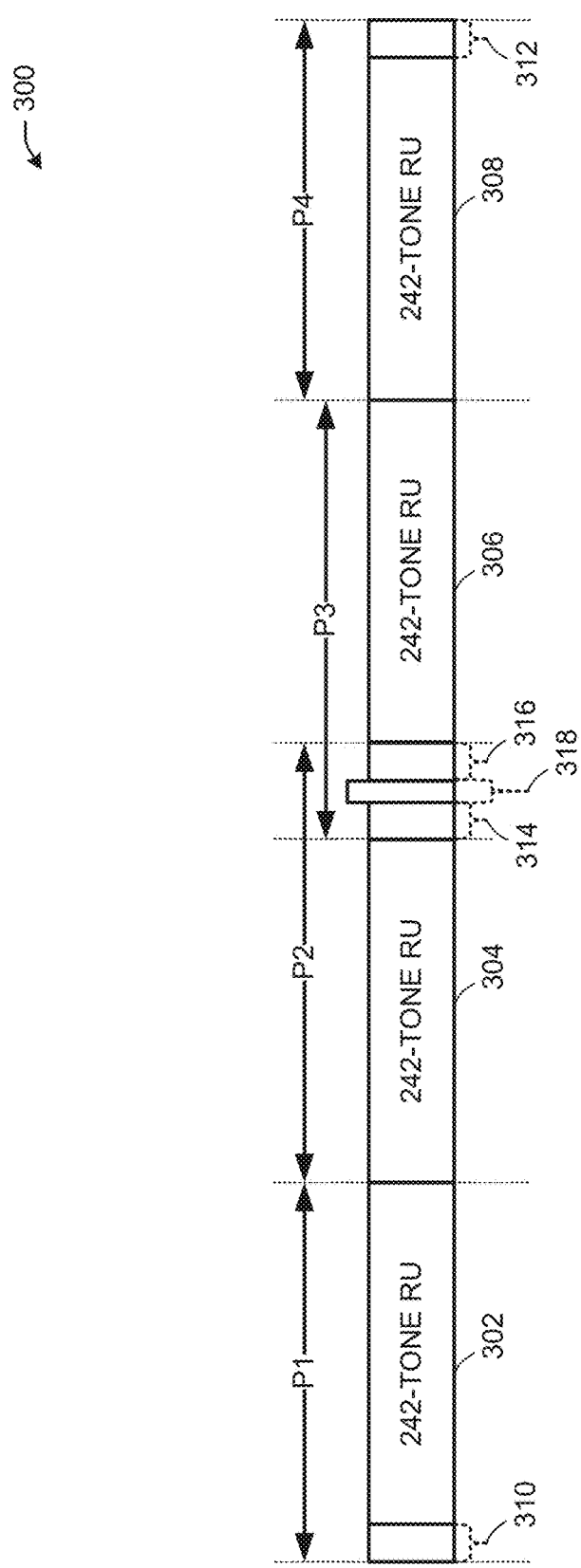
FIG. 3 depicts an illustrative schematic diagram of a tone allocation, in accordance with one or more example embodiments of the present disclosure.

FIG. 3 depicts an illustrative schematic diagram 300 of a tone allocation, in accordance with one or more example embodiments of the present disclosure.

Referring to FIG. 3, an RU allocation may include multiple 242-tone RUs (e.g., RU 302, RU 304, RU 306, RU 308, which may include 242 tones or another number of tones according to a different RU size). The RUs shown may correspond to 20 MHz channels or sub-channels in a larger bandwidth (e.g., a 80 MHz bandwidth). The multi-RU allocation may use guard tones (e.g., guard tones 310, guard tones 312) at the edges of the channel bandwidth. In the center of the bandwidth, a smaller RU with tones 314 and tones 316 may be allocated along with one or more direct current (DC) tones 318. Instead of disabling an exact 20 MHz sub-channel, multiple disable patterns may apply to indicate disabled tones. For example, pattern P1 may indicate the disable pattern from tone −512 to tone −259; pattern P2 may indicate the disable pattern from tone −258 to tone −4, and from tone 4 to tone 16; pattern P3 may indicate the disable pattern from tone −16 to tone −4, and from tone 4 to tone 258; and pattern P4 may indicate the disable pattern from tone 259 to tone 511. Therefore, when using disabling pattern P1, 254 tones out of 256 tones in the first 20 MHz of the 80 MHz bandwidth may be disabled (e.g., tones −258 and −257). When using disabling pattern 2, 253 tones out of 256 tones in the second 20 MHz of the 80 MHz bandwidth may be disabled (e.g., tones −3, −2, −1). When using disabling pattern P3, 252 tones out of 256 tones in the third 20 MHz of the 80 MHz bandwidth may be disabled (e.g., tones 0, 1, 2, and 3). When using disabling pattern P4, 253 tones of the 256 tones in the fourth 20 MHz of the 80 MHz bandwidth may be disabled (e.g., tones 256, 257, 258).

More particularly, the channel bandwidth may span from tone −512 (e.g., at the far left side) to tone 511 (e.g., at the far right side) for a total of 1024 tones (e.g., with tone 0 in the middle). Pattern P1 may refer to disabling the guard tones 310 and the RU 302 (e.g., tone −512 to tone −259). Pattern P2 may refer to disabling the RU 304, the tones 314, and the tones 316 (e.g., from tone −258 to tone −4, and from tone 4 to tone 16). Pattern P3 may refer to disabling the RU 306, the tones 314, and the tones 316 (e.g., from tone −16 to tone −4, and from tone 4 to tone 258). Pattern P4 may refer to disabling the RU 308 and the guard tones 312 (e.g., from tone 259 to tone 511). The 20 MHz channels of the 80 MHz bandwidth may correspond span from −512 through −257 (the first 20 MHz), −256 through −1 (the second 20 MHz), 0 through 255 (the third 20 MHz), and from 256 through 511 (the fourth 20 MHz).

For SU PPDUs, either one 20 MHz channel RU or multiple 20 MHz channel RUs may be disabled in a larger (e.g., 80 MHz) channel. Because a RU boundary may not align exactly with a 20 MHz channel (e.g., a 20 MHz channel may include tones −512 to tone −257, while the RU 302 may include tone −512 to tone −259). Therefore, disabling the first 20 MHz channel in a 80 MHz bandwidth may include disabling the tones in the RU 302 plus tone −258 and tone −257, which may be part of the RU 304, thereby creating punctured tones (e.g., the punctured tones 202 of FIG. 2) for the RU 304.

In one or more embodiments, to avoid the significant changes to Wi-Fi protocols which may be required by having such punctured tones in a new size RU, the patterns P1, P2, P3, and P4 may be adopted to define the disabled tone patterns and to indicate the exact tone puncturing boundaries even when the boundaries do not align with a 20 MHz or other sub-channel. For example, by using pattern P1 from tone −512 to tone −259 instead of disabling an entire 20 MHz channel from tone −512 to tone −257, the extra tones (e.g., tone −258 and tone −257) may not be punctured, thereby avoiding any need to define a new size RU.

In one or more embodiments, when two 20 MHz channels are disabled (e.g., any two RUs of RU 302, RU 304, RU 306, RU 308), then the disable pattern may include a combination of patterns, such as P1+P3 being disabled, or P2+P4 being disabled. The result may be two RUs adding up 484 tones (e.g., a 484-tone RU as defined by the IEEE 802.11 technical standards). When a single 20 MHz channel is disabled (e.g., any RU of RU 302, RU 304, RU 306, RU 308), the remaining three RUs of the aforementioned four RUs may form a 60 MHz channel or sub-channel with a size depending on which disable pattern is applied. For example, when pattern P1 or pattern P4 is applied, the remaining 60 MHz RU may include three 242-tone RUs (e.g., the enabled RUs for P2-P4 or for P1-P3), plus additional tones (e.g., the tones 314 and the tones 316, which may sum to 26 tones). When pattern P2 or pattern P3 is applied, the tones 314 and the tones 316 may be disabled, and the resulting 60 MHz RU may include three RUs of 242 tones. The 60 MHz RUs of 242 tones×3 and 242 tones×3+26 tones are currently undefined by the IEEE 802.11ax technical standard. By disabling tones according to one of the patterns, RU allocation may not require a new RU to signal, as the disabled tones may not overlap with a currently defined RU size, thereby altering (e.g., reducing) the number of tones in a currently defined RU and requiring the definition of a new RU size.

In one or more embodiments, for SU PPDUs, the RU allocation signaling may be acknowledged in an association request/response exchange between an AP (e.g., AP 102 of FIG. 1) and STA (e.g., the one or more user devices 120 of FIG. 1). For MU PPDUs, the RU allocation signaling rules in the HE-SIG-B field of an HEW transmission may need to be updated so that a STA may identify multiple user information fields addressed to the STA. In particular, a STA receiving a downlink HEW frame from an AP may identify multiple user information fields including RU indications addressed to the same STA. Long-term puncturing signaling may be included in an HE operation element of an HEW frame, such as a probe response, association or re-association response, and beacons. The signaling may define the enabled and disabled RUs, subcarriers (tones), or portions of the bandwidth for one or more STAs. For example, when long-term signaling for HE SU PPDUs indicates (e.g., in a HE-SIG-A field of a HEW transmission of a 80 MHz PPDU), devices may use a mode of a 484-tone RU plus a 242-tone RU for which coding is applied across the entire 484+242 tones, but interleaving may be applied separately on the 484-tone RU and on the 242-tone RU. The signaling of non-continuous RU allocations using HE MU PPDUs may be the same as for SU PPDUs, or multiple RUs may be assigned to a STA as indicated in an HE-SIG-B field in a downlink transmission (e.g., with the resulting non-contiguous RU being the sum of the two or more RUs that are assigned to the STA). In HE MU PPDUs, signaling may require more entries to be added to an RU allocation table to indicate the RU modes (e.g., allowing the indication in the HE-SIG-B field with a single per-user field).

Referring to FIGS. 2 and 3, punctured (disabled) tones are not the same as guard tones or DC tones. Therefore, the use of an allocated guard tone or DC tone should not be considered a punctured tone of a RU allocation. For example, puncturing a 20 MHz channel of a 80 MHz bandwidth may include puncturing guard tones or DC tones, so the allocation of a guard tone or DC tone should not be considered the same as puncturing a guard tone or DC tone.

Even though RU allocation may be non-continuous, the puncturing of tones within a subset of a 20 MHz channel (e.g., according to the disabling patterns defined above) may include puncturing of continuous (e.g., sequential) tones of the subset of tones in the channel. Therefore, one or more disabled tones (e.g., tones with no energy) within a portion of a bandwidth which do not form a continuous block of disabled tones within a channel should not be considered the same as the defined patterns of disabled tones of the present disclosure. In particular, the identification by a receiving device of a tone with no energy should not be considered the same as an allocation which specifies that specific tones are to be disabled.

Figure 4A:
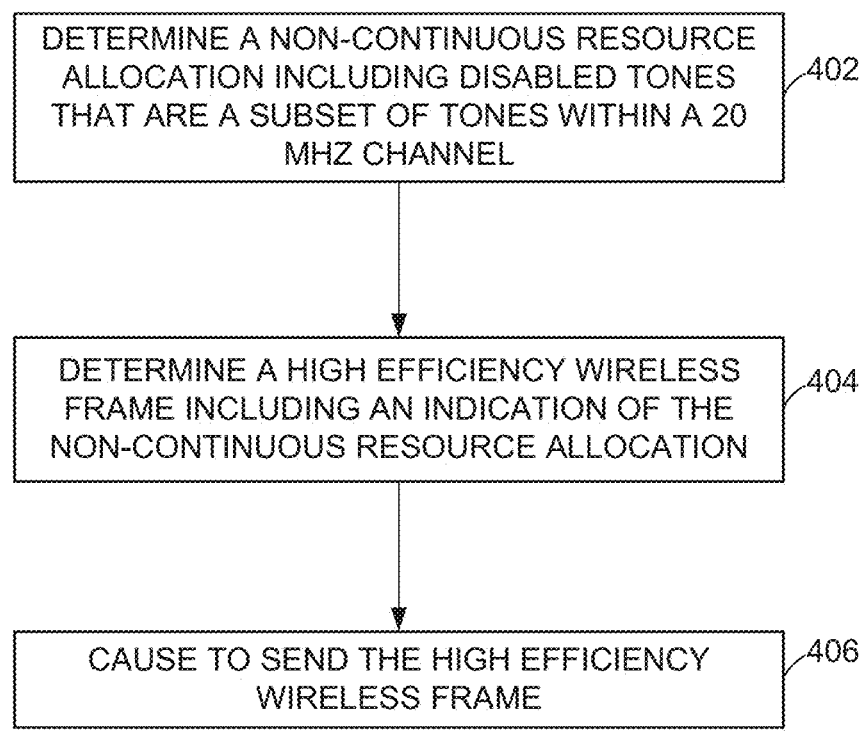
FIG. 4A illustrates a flow diagram of illustrative process for enhanced resource unit allocation in high efficiency wireless (HEW) communications, in accordance with one or more example embodiments of the present disclosure.

FIG. 4A illustrates a flow diagram of illustrative process 400 for enhanced resource unit allocation in high efficiency wireless (HEW) communications, in accordance with one or more example embodiments of the present disclosure.

At block 402, processing circuitry of a device (e.g., the AP 102 of FIG. 1) may determine a non-continuous resource allocation for one or more devices (e.g., the one or more user devices 120 of FIG. 1) in a 80 MHz bandwidth, wherein the 80 MHz bandwidth comprises four 20 MHz channels, wherein the non-continuous resource allocation comprises disabled tones of a 20 MHz channel of the four 20 MHz channels, and wherein the disabled tones are a subset of tones within the 20 MHz channel. For example, the resource allocation may include disabling tones as defined by disabling patterns as described above (e.g., subsets of tones within the 20 MHz channels of the 80 MHz bandwidth). One or more of portions of the 80 MHz bandwidth may be disabled (e.g., pattern P1, pattern P2, pattern P3, pattern P4, pattern P1 and pattern P3, pattern P2 and pattern P4).

At block 404, the processing circuitry may determine an HEW frame including an indication of the non-continuous resource allocation. The indication may be one or more user information frames (e.g., of a HE-SIG-B field) addressed to a STA. The disabled tones may be tone −512 through tone −259 of the 80 MHz bandwidth or may be tone 259 through tone 511. the non-continuous resource allocation may include three 242-tone resources and a 26-tone resource. The disabled tones may include one or more guard tones (e.g., the guard tones 310 and the guard tones 312 of FIG. 3). Multiple, non-adjacent 20 MHz channels may have disabled tones according to the allocation.

At block 406, the processing circuitry may cause the device to send the HEW frame to one or more STAs. For example, the HEW frame may be SU PPDU or a MU PPDU. The HEW frame may include multiple fields addressed to one STA (e.g., may include multiple fields with the same STA identifier).

Figure 4B:
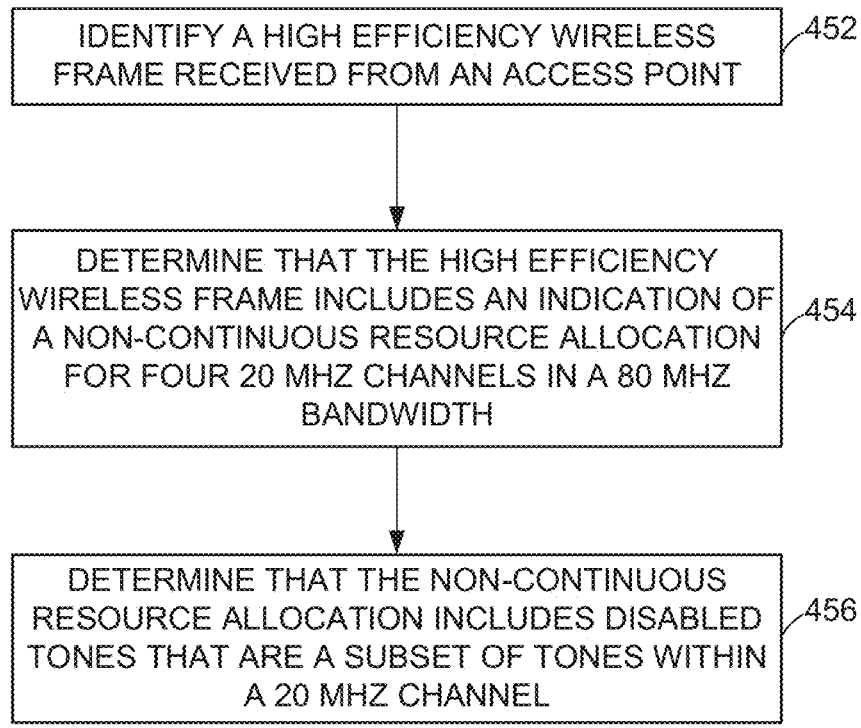
FIG. 4B illustrates a flow diagram of illustrative process for enhanced resource unit allocation in high efficiency wireless (HEW) communications, in accordance with one or more example embodiments of the present disclosure.

FIG. 4B illustrates a flow diagram of illustrative process 450 for enhanced resource unit allocation in high efficiency wireless (HEW) communications, in accordance with one or more example embodiments of the present disclosure.

At block 452, processing circuitry of a device (e.g., the one or more user devices 120 of FIG. 1) may identify an HEW frame received from an AP (e.g., the AP 102 of FIG. 1). The HEW frame may be a management frame or PPDU (e.g., SU PPDU or MU PPDU).

At block 454, the processing circuitry may determine that the HEW frame includes an indication of a non-continuous resource allocation for one or more STAs in a 80 MHz bandwidth that may include four 20 MHz channels. Rather than disabling an entire 20 MHz channel, the allocation may disable tone subsets of one or more of the 20 MHz channel according to a pattern.

At block 456, the processing circuitry may determine that the non-continuous resource allocation includes a subset of tones of a 20 MHz channel that is disabled (e.g., less than all of the tones in the 20 MHz channel may be disabled). The disabled tones may be tone −512 through tone −259 of the 80 MHz bandwidth or may be tone 259 through tone 511. The non-continuous resource allocation may include three 242-tone resources and a 26-tone resource. The disabled tones comprise one or more guard tones (e.g., the guard tones 310 and the guard tones 312 of FIG. 3). Multiple, non-adjacent 20 MHz channels may have disabled tones according to the allocation.

It is understood that the above descriptions are for purposes of illustration and are not meant to be limiting.

FIG. 5 shows a functional diagram of an exemplary communication station 500 in accordance with some embodiments. In one embodiment, FIG. 5 illustrates a functional block diagram of a communication station that may be suitable for use as an AP 102 (FIG. 1) or user device 120 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or media access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in FIGS. 1, 2A-2C, 3, and 4.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a RU allocation device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the RU allocation device 619. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The RU allocation device 619 may carry out or perform any of the operations and processes (e.g., process 400 of FIG. 4A, process 450 of FIG. 4B) described and shown above.

In an embodiment, the RU allocation device 619 may allow for puncturing some tones within a bandwidth without having to puncture an entire sub-channel of the bandwidth. For example, in a 80 MHz bandwidth with four 20 MHz portions and four RUs, rather than puncturing an entire 20 MHz portion, specific tones may be punctured in a manner which does not exactly align with the boundaries of a 20 MHz portion of the 80 MHz bandwidth. In particular, because a first RU of four RUs in a 80 MHz bandwidth may have 242 tones (e.g., from tone −500 through tone −259 of a tone index), and a second RU of the four RUs may have 242 tones (e.g., from tone −258 through tone −17 of a tone index), and because the first 20 MHz of the 80 MHz bandwidth may span from tone −500 through tone −257, allowing the puncturing of the first 20 MHz bandwidth may result in puncturing (e.g., disabling) two tones of the second RU (e.g., tone −258, tone −257). The result may be that the second RU only has 240 tones instead of 242 tones, but there is no defined RU for 240 tones in the IEEE 802.11 technical standards. Therefore, to allow puncturing, new RUs may be defined and signaled (e.g., communicated to STAs).

In one or more embodiments, instead of disabling an exact 20 MHz portion of a 80 MHz channel, the RU allocation device 619 may disable a bandwidth close to, but not exactly, the 20 MHz portion. For example, in a 80 MHz channel, non-continuous resource unit allocation in HEW communications may define multiple disable patterns, such as a pattern P1 for tone indices −512:−259 (tone −512 through tone −259), a pattern P2 for tone indices −258:−4, 4:16 (tone −258 through tone −4, and tone 4 through tone 16), a pattern P3 for tone indices −16:−4, 4:258 (tone −16 through tone −4, and tone 4 through tone 258), and a pattern P4 for tone indices 259:511 (tone 259 through tone 511). Using such tone patterns, the disabling of any RUs for non-continuous resource unit allocation in HEW communications may not result in a punctured RU requiring additional definition and changes to Wi-Fi protocols.

In one or more embodiments, the RU allocation device 619 may disable an exact 20 MHz portion of a 80 MHz channel (resulting in a punctured RU). However, to avoid introducing significant changes to Wi-Fi devices and to Wi-Fi protocols, the RU allocation may be made transparent to baseband processing of wireless devices. In particular, a wireless device transmitter may follow exact baseband processing process flows as defined by the IEEE 802.11ax technical standard. As a result, some tones may fall within a disabled 20 MHz channel. The baseband processing may include coding and tone mapping as if no puncturing is conducted, however. Because the transmitter needs to meet the requirement of the disabled band, the requirement of preamble puncturing as defined by the IEEE 802.11ax technical standard may be reused to minimize the changes required to implement non-continuous resource unit allocation in HEW communications. The signal leakage to the disabled 20 MHz channel from occupied sub-channels (e.g., other 20 MHz sub-channels in the 80 MHz channel) may be less than or equal to −20 dBr (db relative to the maximum spectral density of the signal), starting at 0.5 HMz from the boundary of the disabled channel. Such may result in the punctured tones either having reduced power or zero power so that the receiving device may consider the constellations in the punctured tones as punctured or unreliable constellations for the purpose of decoding the wireless signal. While the punctured tones may impact the signal detection performance of a wireless device, the IEEE 802.11ax technical standard baseband processing may be reused for ease of implementation.

In one or more embodiments, the RU allocation device 619 may define a RU size for a single user (SU) PPDU. For example, either one 20 MHz channel may be disabled in a 80 MHz channel, or multiple 20 MHz channels (e.g., sub-channels) may be disabled in a 80 MHz channel. When multiple (e.g., two) 20 MH non-adjacent sub-channels are disabled (e.g., using either a disable pattern of P1+P3 or P2+P4 as defined above), the remaining two 20 MHz RUs may add up to a 484-tone RU as defined by the IEEE 802.11ax technical standard. When one 20 MHz sub-channel is disabled and the inexact disabled bandwidth defined above is used, non-continuous resource unit allocation in HEW communications may use a new RU corresponding to 60 MHz (e.g., the non-disabled 60 MHz of the 80 MHz channel). The RU size may depend on which disable pattern is applied. For example, when pattern P1 or pattern P4 is applied, the resulting RU may be a 242*3+26 tone RU. When pattern P2 or pattern P3 is applied, the resulting RU may be 242*3 tones. Neither of these RUs are currently defined in the IEEE 802.11ax technical standard, so the present disclosure provides for signaling and processing of the new RUs for non-continuous RU allocation.

In one or more embodiments, the RU allocation device 619 may define a RU size for multi-user (MU) PPDUs (e.g., PPDUs sent to multiple STAs) and trigger-based (TB) PPDUs (e.g., PPDUs sent by STAs in response to trigger frames sent by an AP). For an orthogonal frequency division multiple access (OFDMA) transmission using MU PPDU or TB PPDU, if a non-continuous RU allocation is allowed, many new RU sizes may result (e.g., 242+26 tone RU, 242+52 tone RU, 52+52 tone RU, etc.), significantly impacting the IEEE 802.11ax technical standard implementation and protocols. To allow for both SU PPDU and MU PPDU communications, non-continuous resource unit allocation in HEW communications may add a single new RU size to allow for more transmission efficiency. For example, the new RU size may be 242*3+26 or 242*3 based on which disabled pattern is applied, or non-continuous resource unit allocation in HEW communications may avoid adding any new RU size, thereby not allowing the 60 MHz PPDU for SU transmissions.

In one or more embodiments, SU non-continuous resource unit allocation using the RU allocation device 619 may not require new RU signaling because the information for a disabled RU may be communicated and acknowledged during the association stage (e.g., the stage when STAs request and establish association with a basic service set of an AP). Wireless device transmitters and receivers may follow the baseband processing protocols described above and may skip the disabled RU when applying tone mapping or de-mapping.

In one or more embodiments, MU non-continuous resource unit allocation using the RU allocation device 619 may update RU allocation signaling. For example, the high efficiency signal-B (HE-SIG-B) field of a HEW MU PPDU may need to be updated. To enable the non-continuous RU allocation in HEW communications, an STA may expect to identify more than one user information field in downlink HEW MU PPDU sent by an AP and having an STA identifier matching the receiving STA's identifier (e.g., a receiving STA may identify multiple user information fields addressed to the STA). The STA may parse any RU allocation signaling addressed to the STA in a HEW MU PPDU.

In one or more embodiments, the RU allocation device 619 may provide MAC process changes. For example, non-continuous resource unit allocation in HEW communications may define long-term puncturing signaling for the MAC. The signaling may be included in a high efficiency (HE) operation element of a probe response sent by an AP (e.g., in response to a probe request in which a STA seeks an indication of which wireless networks are provided by any nearby APs), an association or re-association response (e.g., sent by an AP in response to an association or re-association request sent by a STA to associate with a wireless network provided by the AP), beacon sent by the AP, or another frame sent by an AP. The signaling may define the RUs, the subcarriers, and/or the bandwidth (e.g., 5 MHz wide, 20 MHz wide, etc.) that may be used and unused for non-continuous resource unit allocation. A STA associated with an AP may respect the constraints imposed on RU allocation based on the signaling, regardless of the STA transmission mode.

In one or more embodiments, with long-term signaling indicating a puncturing of a secondary 20 MHz channel, and if the PPDU indicates in a high efficiency signal-A (HE-SIG-A) field transmission of a 80 MHz PPDU transmission, the RU allocation device 619 may use a 484-tone RU+a 242-tone RU mode in which coding is performed across the entirety of the 242+484 tones, but interleaving may be performed separately on the 484-tone RU and the 242-tone RU. Both a receiver and transmitter may identify the parameters in the HE-SIG-A field and in the long-term signaling that there is a single transmission mode available for use.

In one or more embodiments, the RU allocation device 619 may signal non-continuous RU allocations using HE MU PPDUs using multiple options. One option (option 1) may be the same as for the SU PPDU, in which long-term signaling indicates the disabled 20 MHz channels, and based on the bandwidth of the PPDU signaled in the HE-SIG-A field and on the RU assigned to the STA in the HE-SIG-B field or another field of the PPDU, the IEEE 802.11ax technical standard may define a specific tone mapping for the resulting RU (e.g., possibly non-continuous) assigned to the STA. Another option (option 2) may assign multiple RUs to a single STA as indicated in the HE-SIG-B field or another field of a PPDU. The resulting non-continuous RU may be the sum of the two or more RUs assigned to the STA. The IEEE 802.11ax technical standard may define the resulting non-continuous RUs based on the combination of allocated RUs, allowing for more combinations of RUs corresponding to different modes of communication. Another option (option 3) may require adding more entries to an RU allocation table in a PPDU to explicitly indicate non-continuous RU modes, thereby allowing the HE-SIG-B field of a PPDU to use a single per-user field for RU allocations.

In one or more embodiments, the RU allocation device 619 may use the options defined above for HE MU PPDUs when using uplink TB PPDUs, but with some adjustments. In one option (option 1), the tone mapping may account for the bandwidth, which may be indicated in the common information filed of a trigger frame, in the RU allocation indicated in the user information field, and/or in the long-term signaling. In another option (option 2), multiple user information fields per STA may be allowed. The total assigned RU may be the result of the combination of the different RUs assigned in the user information fields addressing a single STA. A rule may allow multiple user information fields per STA to be transmitted next to each other (e.g., consecutively in the trigger frame) in a list of the user information fields for the multiple addressed STAs. Another option (option 3) may use a single information field in the trigger frame, but the table for the RU allocation may be modified to include non-continuous RUs.

In one or more embodiments, the RU allocation device 619 may include a capability bit in any frames. The capability bit may indicate that the devices support SU punctured mode.

In one or more embodiments, to puncture RUs with a granularity less than 20 MHz, the RU allocation device 619 may use additional rules (e.g., not currently defined by the IEEE 802.11 technical standards) for coexistence with legacy devices (e.g., pre-IEEE 802.11ax HEW devices).

It is understood that the above are only a subset of what the beacon protection device 619 may be configured to perform and that other functions included throughout this disclosure may also be performed by the RU allocation device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MIS 0) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may be a device comprising memory and processing circuitry configured to: determine a non-continuous resource allocation for one or more devices in a 80 MHz bandwidth, wherein the 80 MHz bandwidth comprises four 20 MHz channels, wherein the non-continuous resource allocation comprises disabled tones of a 20 MHz channel of the four 20 MHz channels, and wherein the disabled tones are a subset of tones within the 20 MHz channel; determine a HEW frame comprising an indication of the non-continuous resource allocation; and cause to send the HEW frame.

Example 2 may include the device of example 1 and/or some other example herein, wherein the disabled tones are tone −512 through tone −259 of the 80 MHz bandwidth or are tone 259 through tone 511, wherein the non-continuous resource allocation consists of three 242-tone resources and a 26-tone resource, and wherein the disabled tones comprise one or more guard tones.

Example 3 may include the device of example 1 and/or some other example herein, wherein the disabled tones are tone −258 through tone −4 and tone 4 through tone 16, or are tone −16 through tone −4 and tone 4 through 16, wherein the non-continuous resource allocation consists of three 242-tone resources, and wherein the disabled tones comprise one or more direct current tones.

Example 4 may include the device of example 1 and/or some other example herein, wherein the 20 MHz channel is a first 20 MHz channel of the 80 MHz bandwidth, wherein the disabled tones are first disabled tones, wherein the non-continuous resource allocation further comprises second disabled tones, wherein the second disabled tones are a subset of tones within a second 20 MHz channel, wherein the non-continuous resource allocation comprises enabled tones, and wherein the enabled tones consist of 752 tones or 726 tones.

Example 5 may include the device of example 4 and/or some other example herein, wherein the first 20 MHz channel and the second 20 MHz channel are non-adjacent channels.

Example 6 may include the device of example 1 and/or some other example herein, wherein the indication of the non-continuous resource allocation is included in a high efficiency signal-B (HE-SIG-B) field of the HEW frame, and wherein the HE-SIG-B field comprises multiple user information fields addressed to a first device of the one or more devices.

Example 7 may include the device of example 1 and/or some other example herein, wherein the 20 MHz channel consists of 256 tones, and wherein the subset of tones consists of 254 tones.

Example 8 may include the device of example 1 and/or some other example herein, wherein the 20 MHz channel consists of 256 tones, and wherein the subset of tones consists of 253 tones.

Example 9 may include the device of example 1 and/or some other example herein, wherein the 20 MHz channel consists of 256 tones, and wherein the subset of tones consists of 252 tones.

Example 10 may include the device of example 1 and/or some other example herein, further comprising a transceiver configured to transmit and receive wireless signals, wherein the wireless signals comprise the HEW frame.

Example 11 may include the device of example 10 and/or some other example herein, further comprising one or more antennas coupled to the transceiver.

Example 12 may include a non-transitory computer-readable medium storing computer-executable instructions which when executed by one or more processors result in performing operations comprising: identifying, at a STA, a HEW frame received from an AP; determining that the HEW frame comprises an indication of a non-continuous resource allocation for one or more devices in a 80 MHz bandwidth, wherein the one or more devices comprise the STA, and wherein the 80 MHz bandwidth comprises four 20 MHz channels; and determining that the non-continuous resource allocation comprises disabled tones of a 20 MHz channel of the four 20 MHz channels, and wherein the disabled tones are a subset of tones within the 20 MHz channel.

Example 13 may include the non-transitory computer-readable medium of example 12 and/or some other example herein, the operations further comprising determining two or more user information fields of the HEW frame, wherein the two or more user information fields comprise an address associated with the station device, and wherein the indication of the non-continuous resource allocation comprises the two or more user information fields.

Example 14 may include the non-transitory computer-readable medium of example 12 and/or some other example herein, wherein the disabled tones are tone −512 through tone −259 of the 80 MHz bandwidth or are tone 259 through tone 511, wherein the non-continuous resource allocation consists of three 242-tone resources and a 26-tone resource, and wherein the disabled tones comprise one or more guard tones.

Example 15 may include the non-transitory computer-readable medium of example 12 and/or some other example herein, wherein the disabled tones are tone −258 through tone −4 and tone 4 through tone 16, or are tone −16 through tone −4 and tone 4 through 16, wherein the non-continuous resource allocation consists of three 242-tone resources, and wherein the disabled tones comprise one or more direct current tones.

Example 16 may include the non-transitory computer-readable medium of example 12 and/or some other example herein, wherein the 20 MHz channel is a first 20 MHz channel of the 80 MHz bandwidth, wherein the disabled tones are first disabled tones, wherein the non-continuous resource allocation further comprises second disabled tones, and wherein the second disabled tones are a subset of tones within a second 20 MHz channel.

Example 17 may include the non-transitory computer-readable medium of example 16 and/or some other example herein, wherein the first 20 MHz channel and the second 20 MHz channel are non-adjacent channels.

Example 18 may include a method comprising: determining, by processing circuitry of an AP, a non-continuous resource allocation for one or more devices in a 80 MHz bandwidth, wherein the 80 MHz bandwidth comprises four 20 MHz channels, wherein the non-continuous resource allocation comprises disabled tones of a 20 MHz channel of the four 20 MHz channels, and wherein the disabled tones are a subset of tones within the 20 MHz channel; determining a high efficiency wireless (HEW) frame comprising an indication of the non-continuous resource allocation; and causing to send the HEW frame.

Example 19 may include the method of example 18 and/or some other example herein, wherein the disabled tones are tone −512 through tone −259 of the 80 MHz bandwidth or are tone 259 through tone 511, wherein the non-continuous resource allocation consists of three 242-tone resources and a 26-tone resource, and wherein the disabled tones comprise one or more guard tones.

Example, 20 may include the method of example 18 and/or some other example herein, wherein the disabled tones are tone −258 through tone −4 and tone 4 through tone 16, or are tone −16 through tone −4 and tone 4 through 16, wherein the non-continuous resource allocation consists of three 242-tone resources, and wherein the disabled tones comprise one or more direct current tones.

Example 21 may include an apparatus comprising means for: determining a non-continuous resource allocation for one or more devices in a 80 MHz bandwidth, wherein the 80 MHz bandwidth comprises four 20 MHz channels, wherein the non-continuous resource allocation comprises disabled tones of a 20 MHz channel of the four 20 MHz channels, and wherein the disabled tones are a subset of tones within the 20 MHz channel; determining a high efficiency wireless (HEW) frame comprising an indication of the non-continuous resource allocation; and causing to send the HEW frame.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

Figure 7:
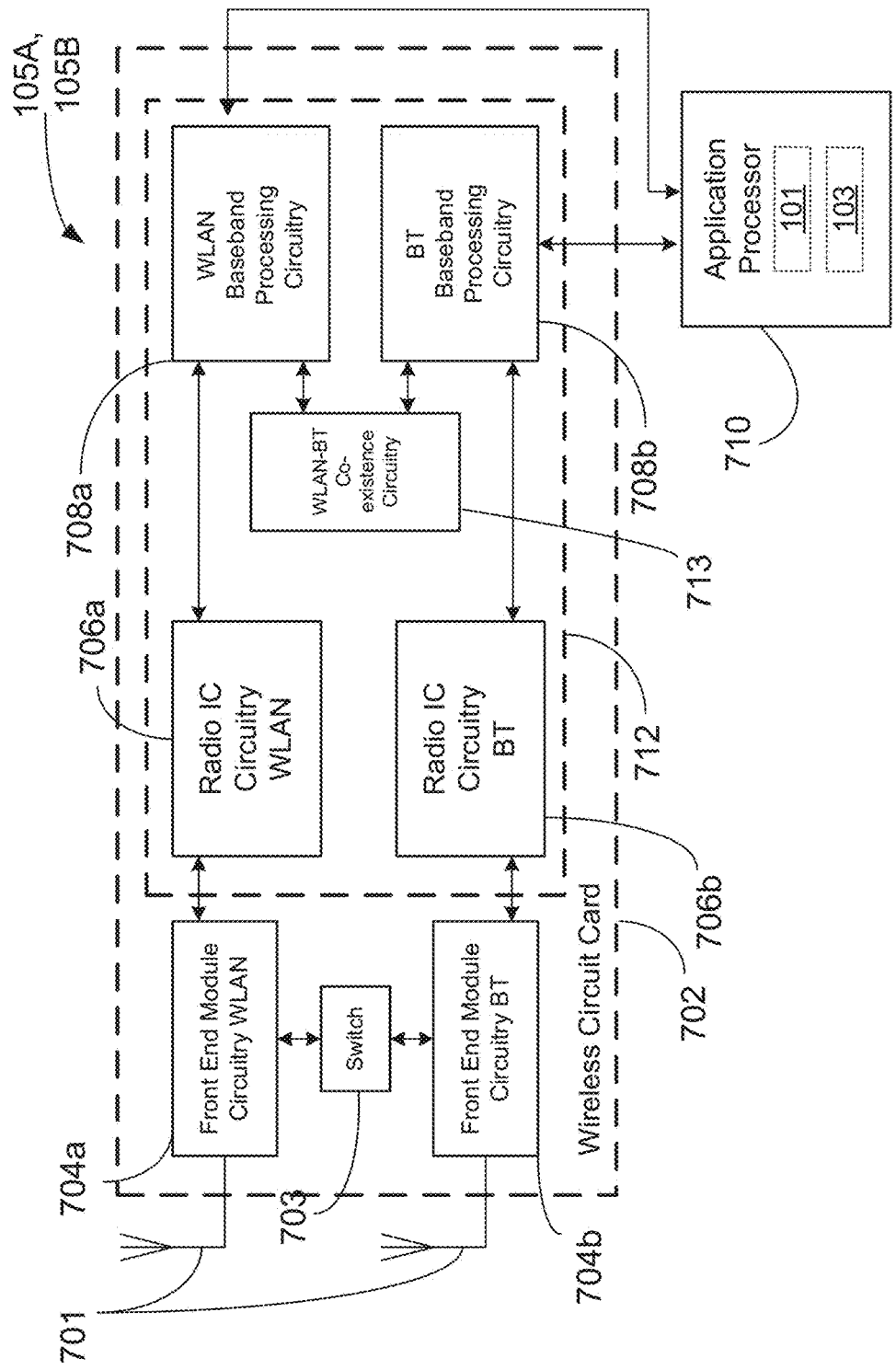
FIG. 7 is a block diagram of a radio architecture in accordance with some examples.

FIG. 7 is a block diagram of a radio architecture 105A, 105B in accordance with some embodiments that may be implemented in any one of the example AP 102 and/or the example user device(s) 120 of FIG. 1. Radio architecture 105A, 105B may include radio front-end module (FEM) circuitry 704a-b, radio IC circuitry 706a-b and baseband processing circuitry 708a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 704a-b may include a WLAN or Wi-Fi FEM circuitry 704a and a Bluetooth (BT) FEM circuitry 704b. The WLAN FEM circuitry 704a may include a receive signal path comprising circuitry configured to operate on WLAN RF signals received from one or more antennas 701, to amplify the received signals and to provide the amplified versions of the received signals to the WLAN radio IC circuitry 706a for further processing. The BT FEM circuitry 704b may include a receive signal path which may include circuitry configured to operate on BT RF signals received from one or more antennas 701, to amplify the received signals and to provide the amplified versions of the received signals to the BT radio IC circuitry 706b for further processing. FEM circuitry 704a may also include a transmit signal path which may include circuitry configured to amplify WLAN signals provided by the radio IC circuitry 706a for wireless transmission by one or more of the antennas 701. In addition, FEM circuitry 704b may also include a transmit signal path which may include circuitry configured to amplify BT signals provided by the radio IC circuitry 706b for wireless transmission by the one or more antennas. In the embodiment of FIG. 7, although FEM 704a and FEM 704b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 706a-b as shown may include WLAN radio IC circuitry 706a and BT radio IC circuitry 706b. The WLAN radio IC circuitry 706a may include a receive signal path which may include circuitry to down-convert WLAN RF signals received from the FEM circuitry 704a and provide baseband signals to WLAN baseband processing circuitry 708a. BT radio IC circuitry 706b may in turn include a receive signal path which may include circuitry to down-convert BT RF signals received from the FEM circuitry 704b and provide baseband signals to BT baseband processing circuitry 708b. WLAN radio IC circuitry 706a may also include a transmit signal path which may include circuitry to up-convert WLAN baseband signals provided by the WLAN baseband processing circuitry 708a and provide WLAN RF output signals to the FEM circuitry 704a for subsequent wireless transmission by the one or more antennas 701. BT radio IC circuitry 706b may also include a transmit signal path which may include circuitry to up-convert BT baseband signals provided by the BT baseband processing circuitry 708b and provide BT RF output signals to the FEM circuitry 704b for subsequent wireless transmission by the one or more antennas 701. In the embodiment of FIG. 7, although radio IC circuitries 706a and 706b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 708a-b may include a WLAN baseband processing circuitry 708a and a BT baseband processing circuitry 708b. The WLAN baseband processing circuitry 708a may include a memory, such as, for example, a set of RAM arrays in a Fast Fourier Transform or Inverse Fast Fourier Transform block (not shown) of the WLAN baseband processing circuitry 708a. Each of the WLAN baseband circuitry 708a and the BT baseband circuitry 708b may further include one or more processors and control logic to process the signals received from the corresponding WLAN or BT receive signal path of the radio IC circuitry 706a-b, and to also generate corresponding WLAN or BT baseband signals for the transmit signal path of the radio IC circuitry 706*a-b*. Each of the baseband processing circuitries 708*a* and 708*b* may further include physical layer (PHY) and medium access control layer (MAC) circuitry, and may further interface with a device for generation and processing of the baseband signals and for controlling operations of the radio IC circuitry 706*a-b*.

Referring still to FIG. 7, according to the shown embodiment, WLAN-BT coexistence circuitry 713 may include logic providing an interface between the WLAN baseband circuitry 708*a* and the BT baseband circuitry 708*b* to enable use cases requiring WLAN and BT coexistence. In addition, a switch 703 may be provided between the WLAN FEM circuitry 704*a* and the BT FEM circuitry 704*b* to allow switching between the WLAN and BT radios according to application needs. In addition, although the antennas 701 are depicted as being respectively connected to the WLAN FEM circuitry 704*a* and the BT FEM circuitry 704*b*, embodiments include within their scope the sharing of one or more antennas as between the WLAN and BT FEMs, or the provision of more than one antenna connected to each of FEM 704*a* or 704*b*.

In some embodiments, the front-end module circuitry 704*a-b*, the radio IC circuitry 706*a-b*, and baseband processing circuitry 708*a-b* may be provided on a single radio card, such as wireless radio card 702. In some other embodiments, the one or more antennas 701, the FEM circuitry 704*a-b* and the radio IC circuitry 706*a-b* may be provided on a single radio card. In some other embodiments, the radio IC circuitry 706*a-b* and the baseband processing circuitry 708*a-b* may be provided on a single chip or integrated circuit (IC), such as IC 712.

In some embodiments, the wireless radio card 702 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11 ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the BT baseband circuitry 708*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 8:
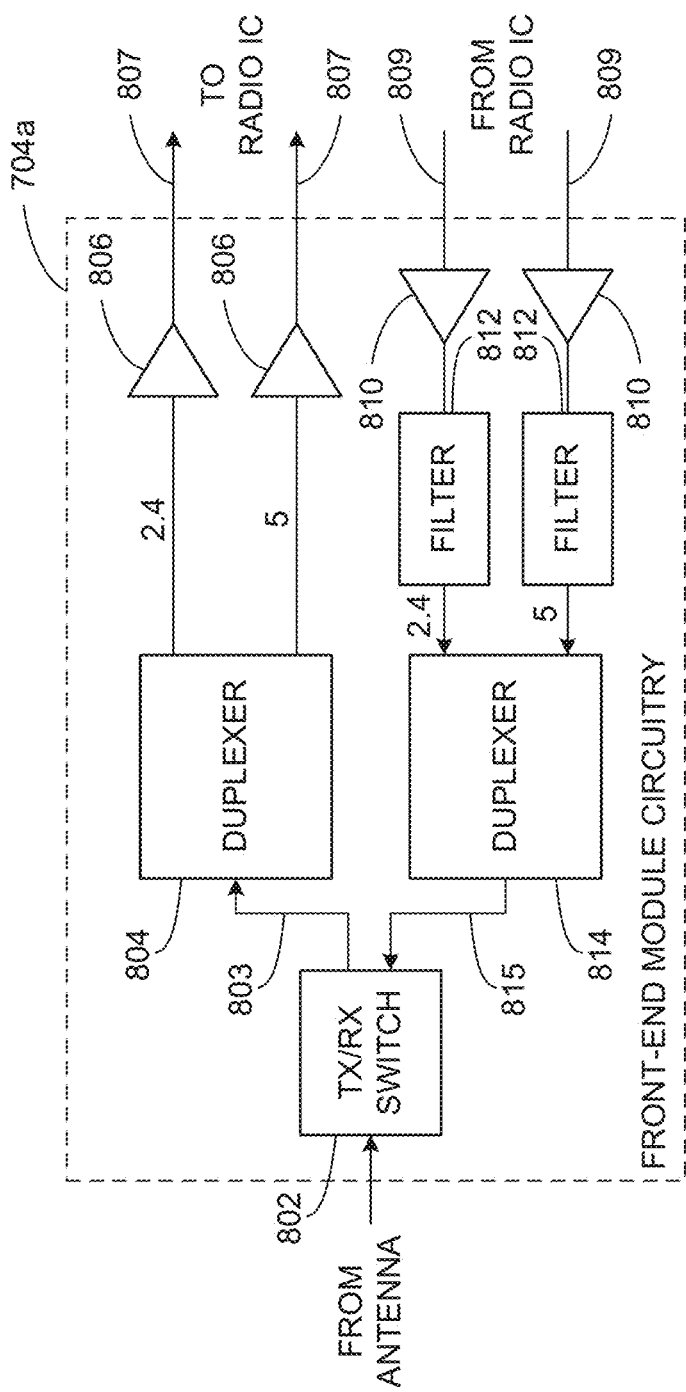
FIG. 8 illustrates an example front-end module circuitry for use in the radio architecture of FIG. 7, in accordance with one or more example embodiments of the present disclosure.

FIG. 8 illustrates WLAN FEM circuitry 704*a* in accordance with some embodiments. Although the example of FIG. 8 is described in conjunction with the WLAN FEM circuitry 704*a*, the example of FIG. 8 may be described in conjunction with the example BT FEM circuitry 704*b* (FIG. 7), although other circuitry configurations may also be suitable.

In some embodiments, the FEM circuitry 704*a* may include a TX/RX switch 802 to switch between transmit mode and receive mode operation. The FEM circuitry 704*a* may include a receive signal path and a transmit signal path. The receive signal path of the FEM circuitry 704*a* may include a low-noise amplifier (LNA) 806 to amplify received RF signals 803 and provide the amplified received RF signals 807 as an output (e.g., to the radio IC circuitry 706*a-b* (FIG. 7)). The transmit signal path of the circuitry 704*a* may include a power amplifier (PA) to amplify input RF signals 809 (e.g., provided by the radio IC circuitry 706*a-b*), and one or more filters 812, such as band-pass filters (BPFs), low-pass filters (LPFs) or other types of filters, to generate RF signals 815 for subsequent transmission (e.g., by one or more of the antennas 701 (FIG. 7)) via an example duplexer 814.

In some dual-mode embodiments for Wi-Fi communication, the FEM circuitry 704*a* may be configured to operate in either the 2.4 GHz frequency spectrum or the 5 GHz frequency spectrum. In these embodiments, the receive signal path of the FEM circuitry 704*a* may include a receive signal path duplexer 804 to separate the signals from each spectrum as well as provide a separate LNA 806 for each spectrum as shown. In these embodiments, the transmit signal path of the FEM circuitry 704*a* may also include a power amplifier 810 and a filter 812, such as a BPF, an LPF or another type of filter for each frequency spectrum and a transmit signal path duplexer 804 to provide the signals of one of the different spectrums onto a single transmit path for subsequent transmission by the one or more of the antennas 701 (FIG. 7). In some embodiments, BT communications may utilize the 2.4 GHz signal paths and may utilize the same FEM circuitry 704a as the one used for WLAN communications.

Figure 9:
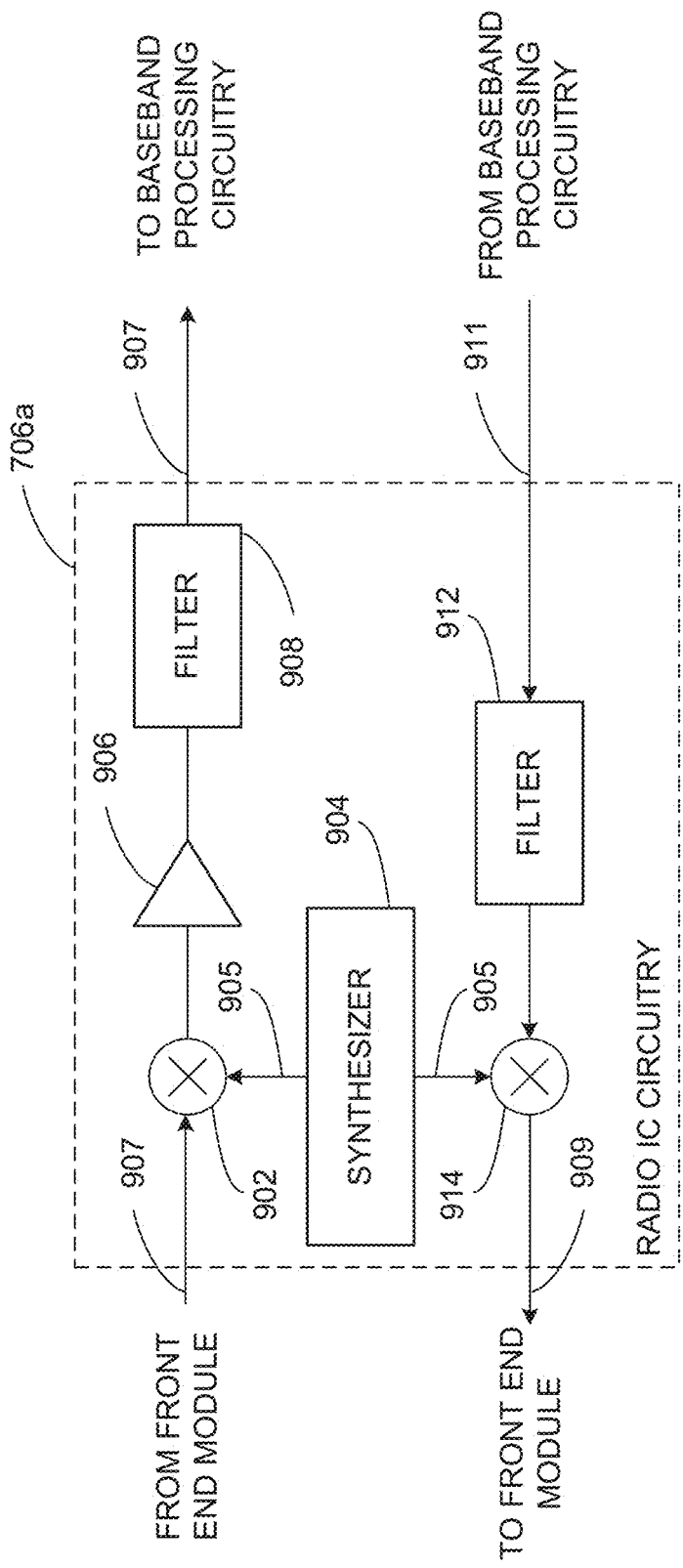
FIG. 9 illustrates an example radio IC circuitry for use in the radio architecture of FIG. 7, in accordance with one or more example embodiments of the present disclosure.

FIG. 9 illustrates radio IC circuitry 706a in accordance with some embodiments. The radio IC circuitry 706a is one example of circuitry that may be suitable for use as the WLAN or BT radio IC circuitry 706a/706b (FIG. 7), although other circuitry configurations may also be suitable. Alternatively, the example of FIG. 9 may be described in conjunction with the example BT radio IC circuitry 706b.

In some embodiments, the radio IC circuitry 706a may include a receive signal path and a transmit signal path. The receive signal path of the radio IC circuitry 706a may include at least mixer circuitry 902, such as, for example, down-conversion mixer circuitry, amplifier circuitry 906 and filter circuitry 908. The transmit signal path of the radio IC circuitry 706a may include at least filter circuitry 912 and mixer circuitry 914, such as, for example, up-conversion mixer circuitry. Radio IC circuitry 706a may also include synthesizer circuitry 904 for synthesizing a frequency 905 for use by the mixer circuitry 902 and the mixer circuitry 914. The mixer circuitry 902 and/or 914 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 9 illustrates only a simplified version of a radio IC circuitry, and may include, although not shown, embodiments where each of the depicted circuitries may include more than one component. For instance, mixer circuitry 914 may each include one or more mixers, and filter circuitries 908 and/or 912 may each include one or more filters, such as one or more BPFs and/or LPFs according to application needs. For example, when mixer circuitries are of the direct-conversion type, they may each include two or more mixers.

In some embodiments, mixer circuitry 902 may be configured to down-convert RF signals 807 received from the FEM circuitry 704a-b (FIG. 7) based on the synthesized frequency 905 provided by synthesizer circuitry 904. The amplifier circuitry 906 may be configured to amplify the down-converted signals and the filter circuitry 908 may include an LPF configured to remove unwanted signals from the down-converted signals to generate output baseband signals 907. Output baseband signals 907 may be provided to the baseband processing circuitry 708a-b (FIG. 7) for further processing. In some embodiments, the output baseband signals 907 may be zero-frequency baseband signals, although this is not a requirement. In some embodiments, mixer circuitry 902 may comprise passive mixers, although the scope of the embodiments is not limited in this respect.

In some embodiments, the mixer circuitry 914 may be configured to up-convert input baseband signals 911 based on the synthesized frequency 905 provided by the synthesizer circuitry 904 to generate RF output signals 809 for the FEM circuitry 704a-b. The baseband signals 911 may be provided by the baseband processing circuitry 708a-b and may be filtered by filter circuitry 912. The filter circuitry 912 may include an LPF or a BPF, although the scope of the embodiments is not limited in this respect.

In some embodiments, the mixer circuitry 902 and the mixer circuitry 914 may each include two or more mixers and may be arranged for quadrature down-conversion and/or up-conversion respectively with the help of synthesizer 904. In some embodiments, the mixer circuitry 902 and the mixer circuitry 914 may each include two or more mixers each configured for image rejection (e.g., Hartley image rejection). In some embodiments, the mixer circuitry 902 and the mixer circuitry 914 may be arranged for direct down-conversion and/or direct up-conversion, respectively. In some embodiments, the mixer circuitry 902 and the mixer circuitry 914 may be configured for super-heterodyne operation, although this is not a requirement.

Mixer circuitry 902 may comprise, according to one embodiment: quadrature passive mixers (e.g., for the in-phase (I) and quadrature phase (Q) paths). In such an embodiment, RF input signal 807 from FIG. 9 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 905 of synthesizer 904 (FIG. 9). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 807 (FIG. 8) may comprise a balanced signal, although the scope of the embodiments is not limited in this respect. The I and Q baseband output signals may be provided to low-noise amplifier, such as amplifier circuitry 906 (FIG. 9) or to filter circuitry 908 (FIG. 9).

In some embodiments, the output baseband signals 907 and the input baseband signals 911 may be analog baseband signals, although the scope of the embodiments is not limited in this respect. In some alternate embodiments, the output baseband signals 907 and the input baseband signals 911 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 904 may be a fractional-N synthesizer or a fractional N/N+1 synthesizer, although the scope of the embodiments is not limited in this respect as other types of frequency synthesizers may be suitable. For example, synthesizer circuitry 904 may be a delta-sigma synthesizer, a frequency multiplier, or a synthesizer comprising a phase-locked loop with a frequency divider. According to some embodiments, the synthesizer circuitry 904 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 904 may be provided by a voltage controlled oscillator (VCO), although that is not a requirement. A divider control input may further be provided by either the baseband processing circuitry 708a-b (FIG. 7) depending on the desired output frequency 905. In some embodiments, a divider control input (e.g., N) may be determined from a look-up table (e.g., within a Wi-Fi card) based on a channel number and a channel center frequency as determined or indicated by the example application processor 710. The application processor 710 may include, or otherwise be connected to, one of the example secure signal converter 101 or the example received signal converter 103 (e.g., depending on which device the example radio architecture is implemented in).

In some embodiments, synthesizer circuitry 904 may be configured to generate a carrier frequency as the output frequency 905, while in other embodiments, the output frequency 905 may be a fraction of the carrier frequency (e.g., one-half the carrier frequency, one-third the carrier frequency). In some embodiments, the output frequency 905 may be a LO frequency (fLO).

Figure 10:
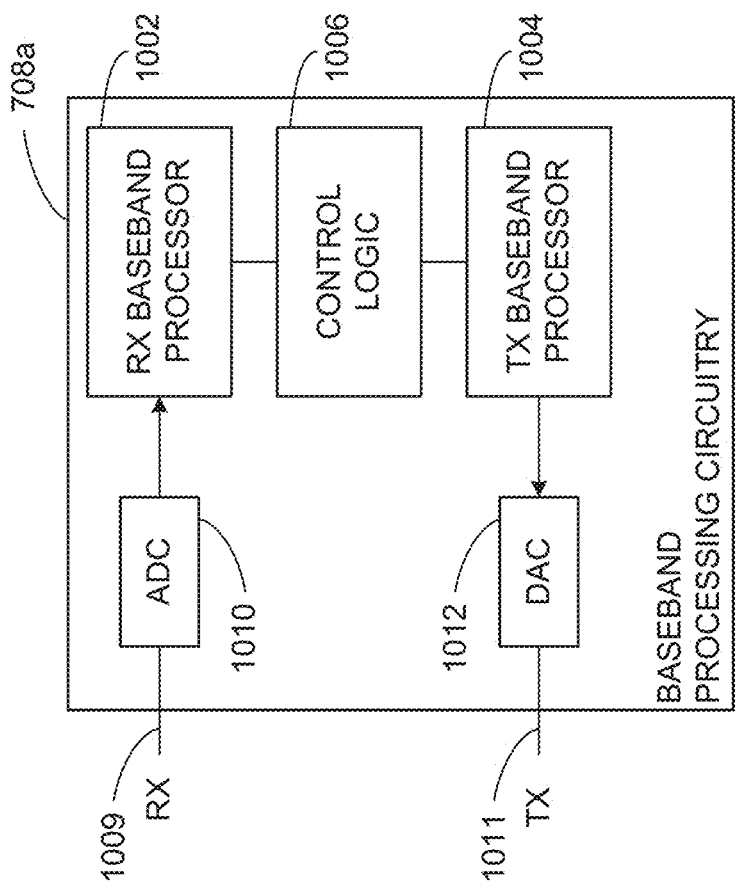
FIG. 10 illustrates an example baseband processing circuitry for use in the radio architecture of FIG. 7, in accordance with one or more example embodiments of the present disclosure.

FIG. 10 illustrates a functional block diagram of baseband processing circuitry 708a in accordance with some embodiments. The baseband processing circuitry 708a is one example of circuitry that may be suitable for use as the baseband processing circuitry 708a (FIG. 7), although other circuitry configurations may also be suitable. Alternatively, the example of FIG. 9 may be used to implement the example BT baseband processing circuitry 708b of FIG. 7.

The baseband processing circuitry 708a may include a receive baseband processor (RX BBP) 1002 for processing receive baseband signals 909 provided by the radio IC circuitry 706a-b (FIG. 7) and a transmit baseband processor (TX BBP) 1004 for generating transmit baseband signals 911 for the radio IC circuitry 706a-b. The baseband processing circuitry 708a may also include control logic 1006 for coordinating the operations of the baseband processing circuitry 708a.

In some embodiments (e.g., when analog baseband signals are exchanged between the baseband processing circuitry 708a-b and the radio IC circuitry 706a-b), the baseband processing circuitry 708a may include ADC 1010 to convert analog baseband signals 1009 received from the radio IC circuitry 706a-b to digital baseband signals for processing by the RX BBP 1002. In these embodiments, the baseband processing circuitry 708a may also include DAC 1012 to convert digital baseband signals from the TX BBP 1004 to analog baseband signals 1011.

In some embodiments that communicate OFDM signals or OFDMA signals, such as through baseband processor 708a, the transmit baseband processor 1004 may be configured to generate OFDM or OFDMA signals as appropriate for transmission by performing an inverse fast Fourier transform (IFFT). The receive baseband processor 1002 may be configured to process received OFDM signals or OFDMA signals by performing an FFT. In some embodiments, the receive baseband processor 1002 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 7, in some embodiments, the antennas 701 (FIG. 7) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 701 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

What is claimed is:

1. An apparatus for allocating frequency resources, the apparatus comprising processing circuitry coupled to storage, the processing circuitry configured to execute instructions to:
   identify a first resource unit in a communication channel, the first resource unit consisting of a first number of tones;
   identify a second resource unit in the communication channel, the second resource unit consisting of a second number of tones different than the first number of tones;
   generate an extremely high throughput frame comprising an indication that a third resource unit is allocated to a station device, the third resource unit allocating only the first resource unit and the second resource unit non-contiguously; and
   transmit the extremely high throughput frame.

2. The apparatus of claim 1, wherein the first number of tones is 242 tones.

3. The apparatus of claim 1, wherein the second number of tones is 484 tones.

4. The apparatus of claim 1, wherein a fourth resource unit is between the first resource unit and the second resource unit in the communication channel, the fourth resource unit consisting of a third number of tones, wherein the third number of tones is 242 tones, and wherein the indication that the third resource unit is allocated to the station device comprises an indication that the fourth resource unit is not allocated to any station device.

5. The apparatus of claim 1, wherein the indication that the third resource unit is allocated to the station device comprises an indication that a fourth resource unit in the communication channel is punctured.

6. The apparatus of claim 1, further comprising a transceiver configured to transmit and receive wireless signals, wherein the wireless signals comprise the extremely high throughput frame.

7. The apparatus of claim 6, further comprising an antenna coupled to the transceiver.

8. The apparatus of claim 1, wherein the first number of tones comprises 242 tones.

9. The apparatus of claim 1, wherein the first number of tones is 242 tones and wherein the second number of tones is 484 tones.

10. A non-transitory computer-readable medium storing computer-executable instructions which when executed by one or more processors result in performing operations comprising:
   identifying, by an access point device, a first resource unit in a communication channel, the first resource unit consisting of a first number of tones;
   identifying, by the access point device, a second resource unit in the communication channel, the second resource unit consisting of a second number of tones different than the first number of tones;
   generating, by the access point device, an extremely high throughput frame comprising an indication that a third resource unit is allocated to a station device, the third resource unit allocating only the first resource unit and the second resource unit non-contiguously; and
   transmitting, by the access point device, the extremely high throughput frame.

11. The non-transitory computer-readable medium of claim 10, wherein the first number of tones is 242 tones.

12. The non-transitory computer-readable medium of claim 10, wherein the second number of tones is 484 tones.

13. The non-transitory computer-readable medium of claim 10, wherein the indication that the third resource unit is allocated to the station device comprises an indication that a fourth resource unit in the communication channel is punctured.

14. A method comprising:
   identifying, by processing circuitry of an access point device, a first resource unit in a communication channel, the first resource unit consisting of a first number of tones;
   identifying, by the processing circuitry, a second resource unit in the communication channel, the second resource unit consisting of a second number of tones different than the first number of tones;
   generating, by the processing circuitry, an extremely high throughput frame comprising an indication that a third resource unit is allocated to a station device, the third resource unit allocating only the first resource unit and the second resource unit non-contiguously; and
   transmitting, by the processing circuitry, the extremely high throughput frame.

15. The method of claim 14, wherein the first number of tones is 242 tones and wherein the second number of tones is 484 tones.

16. The method of claim 14, wherein a fourth resource unit is between the first resource unit and the second resource unit in the communication channel, the fourth resource unit consisting of a third number of tones, wherein the third number of tones is 242 tones, and wherein the indication that the third resource unit is allocated to the station device comprises an indication that the fourth resource unit is not allocated to any station device.

17. The method of claim 14, wherein the indication that the third resource unit is allocated to the station device comprises an indication that a fourth resource unit in the communication channel is punctured.

* * * * *